(12) United States Patent
Adoline et al.

(10) Patent No.: US 8,292,274 B2
(45) Date of Patent: Oct. 23, 2012

(54) DAMPENED COMPRESSION SPRING ROD

(75) Inventors: Jack W. Adoline, Toledo, OH (US); Thomas J. Fischer, Whitehouse, OH (US)

(73) Assignee: Barnes Group Inc., Bristol, CT (US)

( * ) Notice: Subject to any disclaimer, the term of this patent is extended or adjusted under 35 U.S.C. 154(b) by 1161 days.

(21) Appl. No.: 10/820,280

(22) Filed: Apr. 8, 2004

(65) Prior Publication Data

US 2004/0222579 A1    Nov. 11, 2004

(51) Int. Cl.
*F16F 1/04* (2006.01)
(52) U.S. Cl. .......... 267/291; 267/168; 267/290
(58) Field of Classification Search ......... 267/250, 267/252, 168, 70, 92, 145, 290, 289, 291, 267/221; 188/322.15, 322.16, 322.17, 284, 188/282.1
See application file for complete search history.

(56) References Cited

U.S. PATENT DOCUMENTS

| | | | |
|---|---|---|---|
| 571,972 A | 11/1896 | Janney | |
| 1,329,561 A | 2/1920 | Thompson | |
| 1,605,798 A * | 11/1926 | Van Crombrugge | 267/225 |
| 1,857,750 A * | 5/1932 | Wilbur | 92/84 |
| 2,948,529 A | 8/1960 | Maier | |
| 3,131,921 A | 5/1964 | Karbowniczek | |
| 3,977,712 A | 8/1976 | Northrop et al. | |
| RE29,545 E | 2/1978 | Deisenroth | |
| 4,148,469 A * | 4/1979 | Geyer | 267/4 |
| 4,651,979 A | 3/1987 | Freitag | |
| 4,693,343 A | 9/1987 | Boyd | |
| 4,962,916 A | 10/1990 | Palinkas | |
| 5,014,004 A | 5/1991 | Kreibich | |
| 5,291,974 A | 3/1994 | Bianchi | |
| 5,360,123 A | 11/1994 | Johnston | |
| 5,482,261 A | 1/1996 | Ortega | |
| 5,511,868 A | 4/1996 | Eftefield | |
| 5,551,674 A * | 9/1996 | Johnsen | 267/168 |
| 5,620,066 A | 4/1997 | Schuttler | |
| 5,728,174 A * | 3/1998 | Fitzlaff | 623/46 |
| 5,810,339 A | 9/1998 | Kuspert | |
| 5,855,363 A * | 1/1999 | Svendsen | 267/132 |
| 5,887,857 A | 3/1999 | Perrin | |

(Continued)

FOREIGN PATENT DOCUMENTS

DE    2461838    6/1976
(Continued)

OTHER PUBLICATIONS

U.S. Appl. No. 10/056,941, filed Jan. 28, 2002.

*Primary Examiner* — Robert A Siconolfi
*Assistant Examiner* — Mariano Sy
(74) *Attorney, Agent, or Firm* — Fay Sharpe LLP; Brian E. Turung

(57) ABSTRACT

A spring system for relatively displacing elements attached to end mounts of the rod assembly comprises a housing having a rod member movable between extended and retracted positions relative thereto, and a first compression spring in the housing surrounded by a second compression spring for biasing the rod member to one of an extended or retracted position relative to the housing. The two springs are oppositely wound whereby, from a compressed condition, the spring rod exerts an expansion force which increases at a linear rate. The spring system includes a valve arrangement to control the rate at which the spring rod moves from a retracted position to an extended position.

95 Claims, 16 Drawing Sheets

U.S. PATENT DOCUMENTS

| | | | |
|---|---|---|---|
| 5,937,962 A * | 8/1999 | Yokoyama | 180/205 |
| 5,946,946 A | 9/1999 | Sharp | |
| 5,984,058 A | 11/1999 | Danneker | |
| 6,026,755 A | 2/2000 | Long | |
| 6,179,099 B1 | 1/2001 | Koch et al. | |
| 6,199,843 B1 | 3/2001 | DeGrace | |
| 6,315,093 B1 * | 11/2001 | Miura et al. | 188/282.1 |
| 6,615,450 B2 * | 9/2003 | Salice | 16/85 |
| 6,673,002 B2 | 1/2004 | Trovinger et al. | |
| 6,773,003 B2 | 8/2004 | Dermody, Jr. | |

FOREIGN PATENT DOCUMENTS

| | | | |
|---|---|---|---|
| DE | 2722884 | | 11/1978 |
| DE | 2722884 A1 | | 6/1980 |
| DE | 3716205 A1 * | | 11/1987 |
| DE | 3716205 C2 | | 11/1987 |
| DE | 393 9118 | | 5/1991 |
| DE | 3939118 A1 | | 5/1991 |
| DE | 3939118 C2 | | 5/1991 |
| DE | 19 504961 | | 8/1996 |
| DE | 195 04 951 | | 8/1996 |
| DE | 200 00 940 U1 | | 5/2000 |
| DE | 200 00940 | | 5/2000 |
| GB | 2036247 A | | 6/1980 |
| JP | 5 705934 | | 1/1982 |
| JP | 57057934 | | 4/1982 |

* cited by examiner

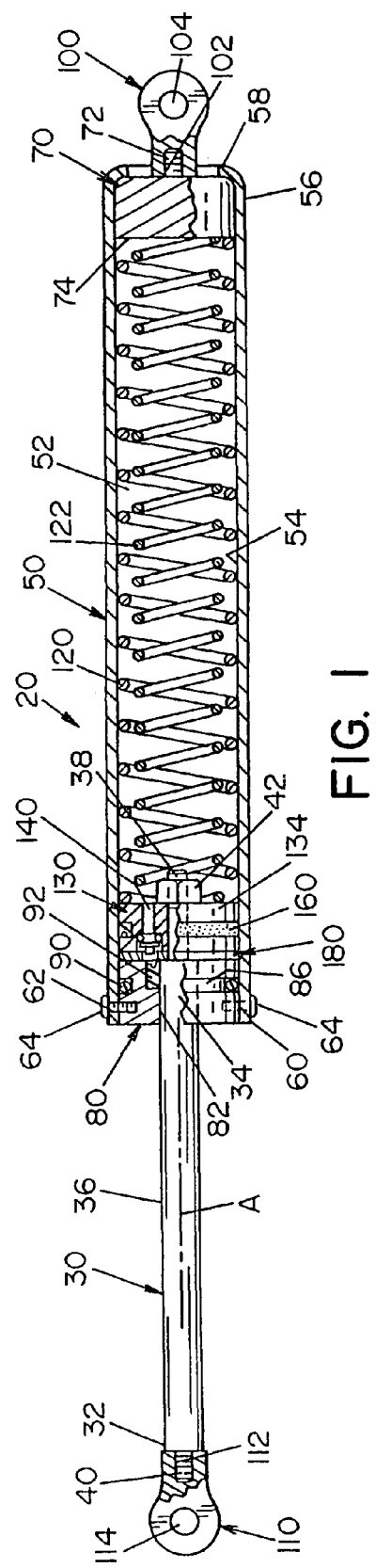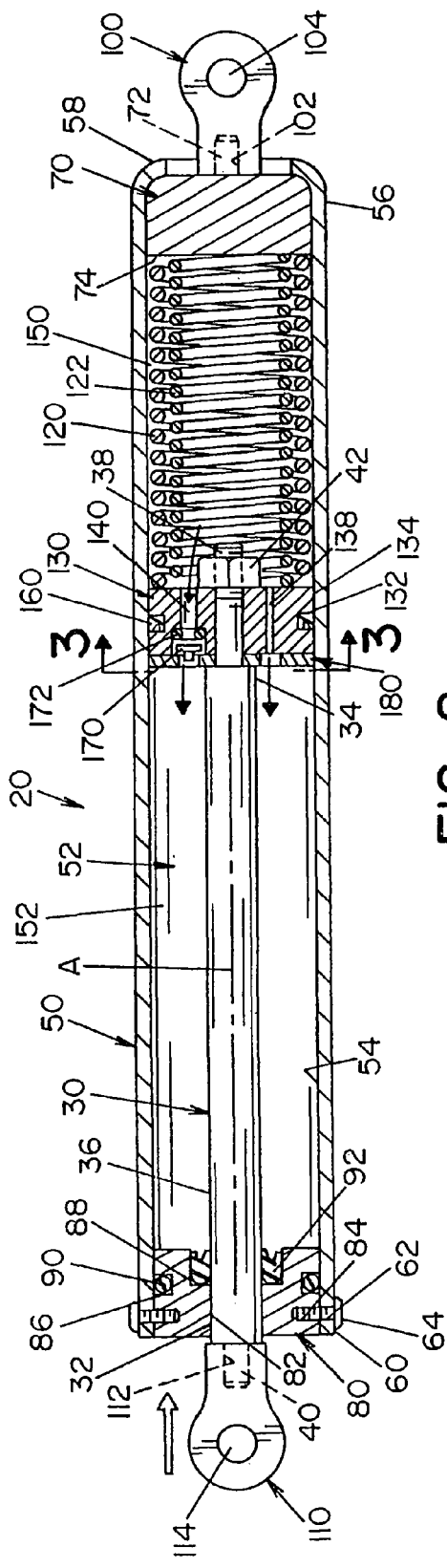

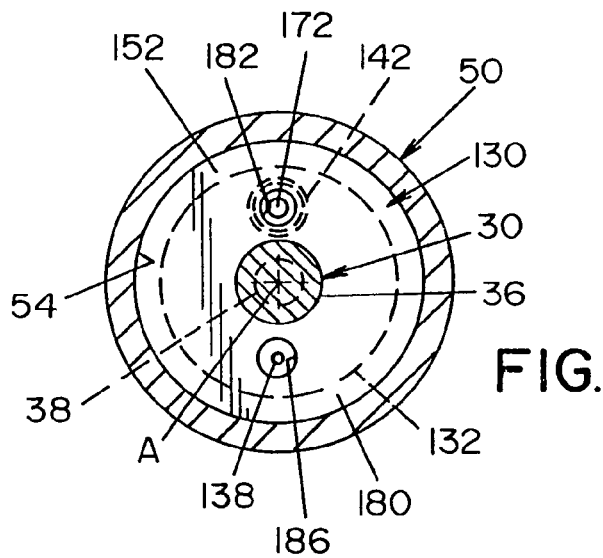
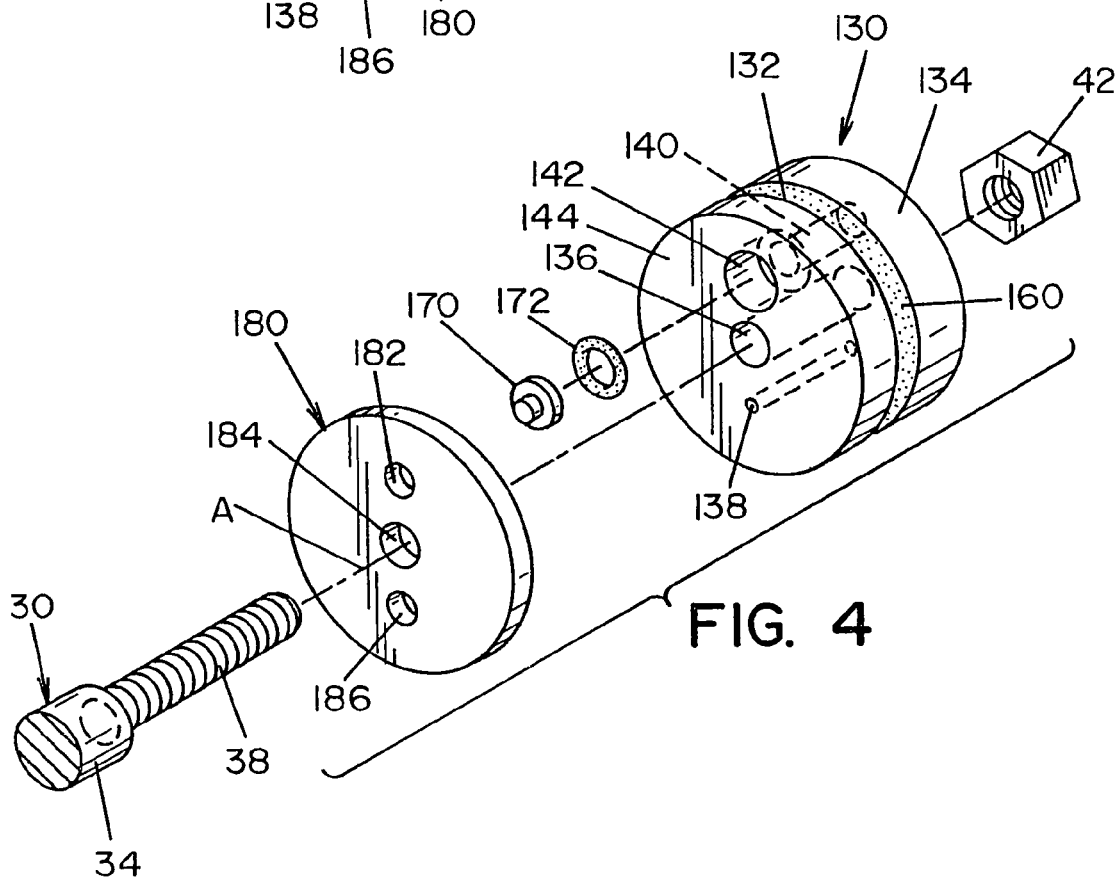

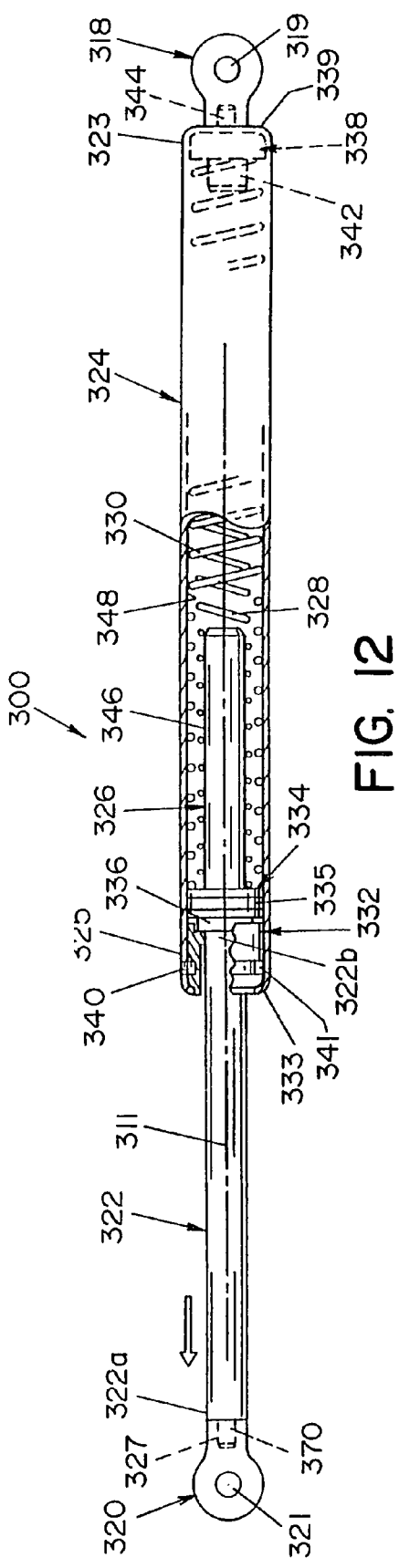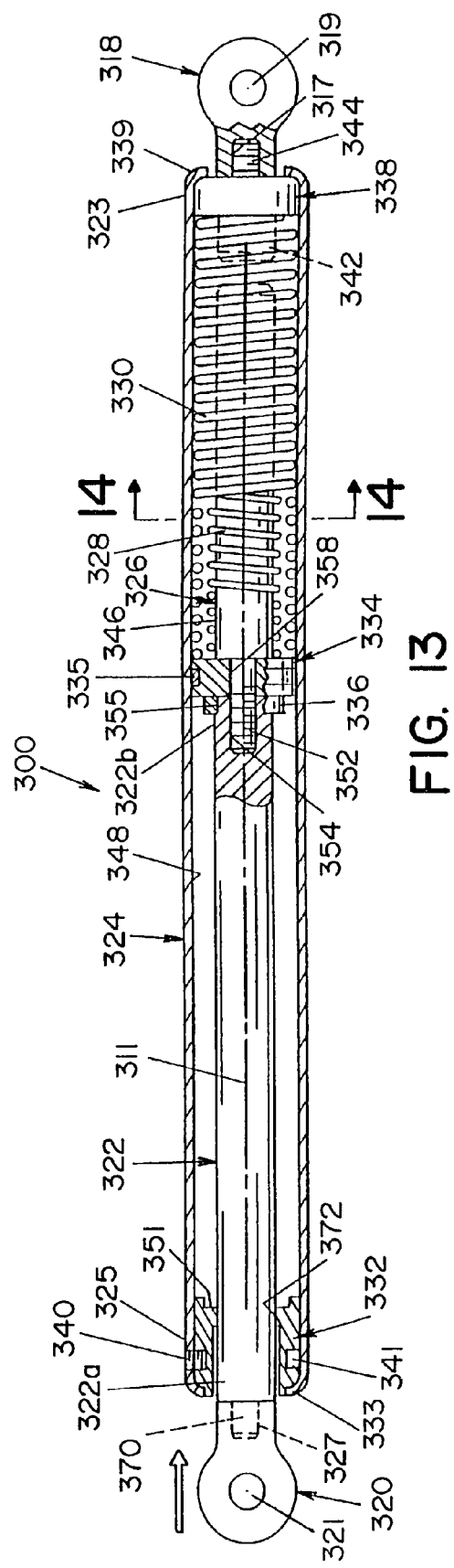

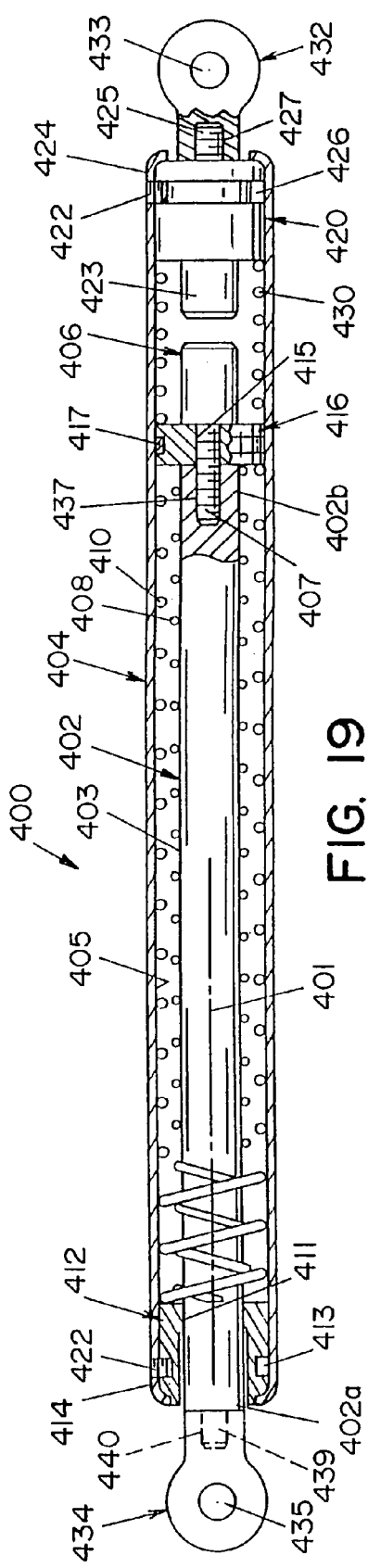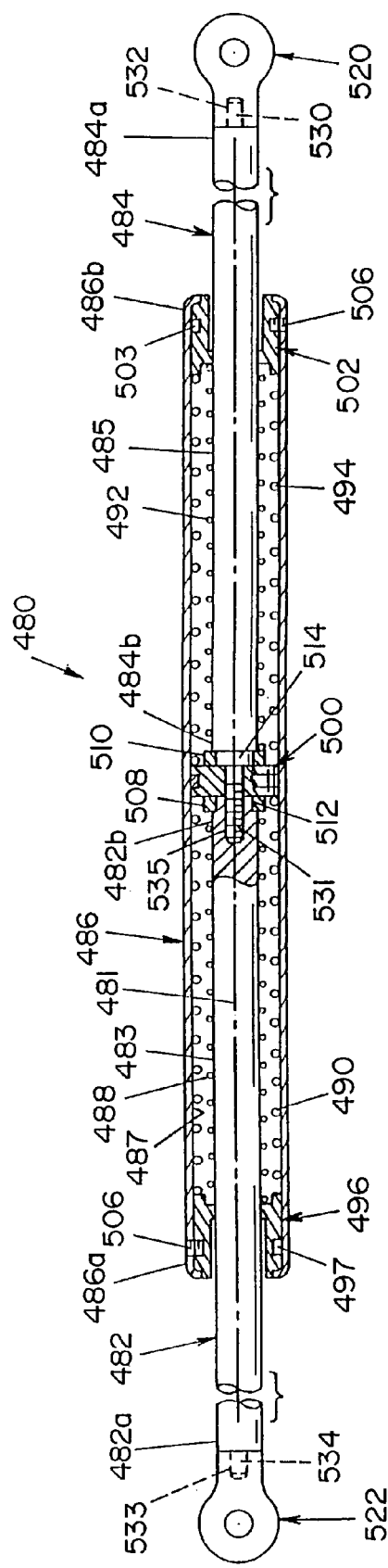

DAMPENED COMPRESSION SPRING ROD

The present invention is claims priory on PCT/US03/00754 filed Jan. 10, 2003, which in turn is a continuation-in-part of co-pending U.S. patent application Ser. No. 10/056,941 filed Jan. 28, 2002.

The present invention relates to compression spring rods, and more particularly to a spring and rod assembly that exerts an expansional force which increases at a substantially linear rate.

INCORPORATION BY REFERENCE

U.S. Pat. No. 6,199,843 to DeGrace; U.S. Pat. No. 6,179,099 to Koch, et al.; U.S. Pat. No. 5,810,339 to Küspert, et al.; and U.S. Pat. No. 4,962,916 to Palinkas are incorporated herein by reference as background information with regard to spring mechanisms. Also incorporated herein by reference is Assignee's U.S. patent application Ser. No. 10/056,941 filed Jan. 28, 2002.

BACKGROUND OF THE INVENTION

The present invention relates to compression spring rods such as a spring and rod assembly that exerts an expansional force which increases at a linear rate. The compression spring rods embodying the present invention are useful in motor vehicles for easing the opening of closure members such as luggage compartment lids, engine compartment lids, hatchbacks, doors, etc; however, the springs can be used in applications other than for vehicles (e.g., garage doors, windows, etc.). The present invention is still more particularly directed to springs having a rod member to exert the driving force on the elements to be displaced.

Compression spring rods are used in various applications, for example, to assist in lifting, opening, and damping. Typical applications include lifting a lid hinged to a stationary base. Other applications include lifting and/or balancing elements for the trunk or hatchback of an automobile. Still another application includes a damping spring for closing a door hinged to a stationary frame. Most applications involve the use of a pneumatic or gas spring to assist the opening motion. Many of these types of compression spring assemblies contain either gas or hydraulic fluid to control forces and piston speeds. Consequently, because these products contain a gas and/or fluid, they are subject to premature failure, due to the leakage of the gas or fluid over time. The leakage results in a loss of control forces and a subsequent loss of spring life. Two types of prior art gas springs are disclosed in U.S. Pat. Nos. 5,887,857 and 6,179,099, both of which are incorporated herein by reference.

In an effort to overcome the past deficiencies of springs, a spring system having multiple springs was developed as disclosed in U.S. patent application Ser. No. 10/056,941 filed Jan. 28, 2002. The multiple spring system was designed so as to produce a linear load versus deflection curve. Although the multiple spring system is a significant improvement over past spring configurations, the rate at which the multiple spring system was compressed or expanded was essentially dependent on the load applied to the multiple spring system. In some applications, the rate at which a spring system is compressed or expanded may need to be altered in certain application to inhibit or prevent overly rapid compression or expansion of the spring system. In view of the present state of the art, there remains need for a spring system that overcomes the past problems with gas spring systems and also which controls the rate of compression and/or expansion of the spring system.

SUMMARY OF THE INVENTION

The present invention provides an improved compression spring system which overcomes the above referred-to difficulties and others with regard to such rods heretofore available. The compression spring system in accordance with the invention is particularly adapted for lifting or pivoting one component relative to another component at a controlled rate. In accordance with one embodiment of the invention, the spring system provides a lift mechanism for hinged covers and the like that operates automatically upon release of the cover, and/or a lift mechanism for a loaded platform wherein the platform is elevated, progressively, as the load thereon is reduced. In accordance with still another and/or alternative embodiment of the invention, the spring system applies a substantially constant and controlled force during the expansion of the spring system. In accordance with still another and/or alternative embodiment of the invention, the spring system is able to support significant loads while maintaining strength over a greater number of operating cycles than existing pneumatic or gas spring designs. In accordance with yet another and/or alternative embodiment of the invention, the spring system provides a mechanical compression rod assembly that can yield controllable forces over a long period of use and control the spring forces during both extension and compression. In accordance with a further and/or alternative embodiment of the invention, the compression spring reduces the rate at which the spring system expands and/or contracts.

In accordance with one aspect of the present invention, the spring system includes a plurality of compression springs. The compression springs typically build potential force as the springs are compressed and release force when the springs are expanded. In one embodiment of the invention, the spring system includes at least two compression springs. In one aspect of this embodiment, the spring system includes two compression springs. In another and/or alternative aspect of this embodiment, the spring system includes three compression springs. In still another and/or alternative aspect of this embodiment, the spring system includes four compression springs. In yet another and/or alternative aspect of this embodiment, the spring system includes five compression springs. In another and/or alterative embodiment of the invention, the compression of the plurality of compression springs together produce a generally linear load versus deflection curve over a substantial portion of the deflection curve. In one aspect of this embodiment, the plurality of compression springs together produce a generally linear load versus deflection curve over a majority of the deflection curve. In another and/or alternative aspect of this embodiment, at least two of the compression springs have a different load versus deflection curve. In still another and/or alternative aspect of this embodiment, all of the compression springs have a different load versus deflection curve. In yet another and/or alternative aspect of this embodiment, at least two of the compression springs have the same load versus deflection curve. In still yet another and/or alternative aspect of this embodiment, at least two of the compression springs have different lengths. In a further and/or alternative aspect of this embodiment, at least two of the compression springs have the same length. In a still a further and/or alternative aspect of this embodiment, at least two of the compression springs have a different spring rate. In a yet a further and/or alternative aspect of this embodiment, at least two of the compression springs have the same spring rate. In a still yet a further and/or alternative aspect of this embodiment, at least two of the compression springs are formed from differing wire thickness and/or different materials. In another and/or alternative aspect of this embodiment, at least two of the compression springs are formed from the same wire thickness and/or the same materials. In one non-limiting design, one or more of the compression springs is made of music wire (ASTM A228) and/or 302 stainless steel. As can be appreciated, other materials can be used. As can be appreciated, the particular thickness of the wire used for each of the compression springs, the particular material used for the compression springs, the inner and outer diameter of the each of the compression springs, the number of windings of each compression spring, the number of compression springs used in the spring system, the length of each of the compression springs, the manner in which the compression springs are oriented with respect to one another, the spring rate of each of the compression springs, and other factors will be in part dependent on the function and end use of the spring system. For example, a spring system connected to a lid of a storage container can include two compression springs wherein the inner compression spring is made of stainless steel and has a wire diameter of about 0.03-0.07 inch, an inside diameter of about 0.3-0.8 inch, an outside diameter of about 0.36-0.94 inch, a free length of about 10-25 inches, and a spring rate of about 0.5-1.5 lbs./inch; and the outer compression spring is made of stainless steel and has a wire diameter of about 0.06-0.1 inch, an inside diameter of about 0.4-1 inch, an outside diameter of about 0.52-1.2 inches, a free length of about 8-18 inches, and a spring rate of 1.5-5 lbs./inch. The inner and outer compression springs each have a different load verses deflection curve. The two compression springs are combined in spring system to produce a load verses deflection curve that matches a particular application for the spring system. As can be appreciated, may other configurations can be used.

In accordance with another and/or alternative aspect of the present invention, the spring system includes a plurality of compression springs wherein at least two of the compression springs are wound in differing directions with respect to another compression spring. The differing direction of winding of one or more of the compression springs with respect to one or more other compression springs facilitates in packaging the multiple springs in a housing. The differing direction of winding of one or more of the compression springs with respect to one or more other compression springs also facilitates in allowing for proper compression and/or expansion of the two or more springs in a housing. In one embodiment of the invention, at least two of the compression springs are wound in substantially opposite directions.

In accordance with still another and/or alternative aspect of the present invention, the spring system includes at least one spring guide to reduce the incidence of spring buckling during the operation of the spring assembly. Spring buckling typically occurs when the compression springs are being compressed. The spring guide is designed to inhibit or prevent such buckling during the operation of the spring assembly. The spring guide can also or alternatively be designed to control and/or limit the movement of the springs to thereby inhibit or prevent the springs becoming tangled within the housing of the spring system, thus resulting in the impairment of the operation of the spring system. The spring guide can also or alternatively be designed to control and/or limit the movement of the springs reduce or prevent reorientation of two or more springs with respect to one another which reorientation adversely affects the operation of the spring system. In one embodiment of the invention, at least one spring guide is designed to move in the housing of the spring system and to at least partially extend into the interior of the spring along the longitudinal axis of the spring. For instance, a spring in the form of a coil has an inner void region that is substantially cylindrically shaped. The spring guide for such a spring is shaped and sized to be inserted into this void inner region. In one non-limiting design, the spring guide has a maximum cross-sectional length that is less than the diameter of the substantially cylindrically shaped void inner region of the spring. In another and/or alternative non-limiting design, the spring guide has a substantially circular cross-sectional shape. As can be appreciated, the shape of cross-sectional shape of the spring guide can have other shapes. The spring guide can be designed to fully or partially extend the full longitudinal length of the spring when the spring is in a compressed position in the housing of the spring system. In another and/or alternative embodiment of the invention, at least one spring guide is positioned in a substantially fixed positioned at an interior end of the housing of the spring system. In one aspect of this embodiment, the spring guide is an end plug that is shaped and sized to be inserted into the void inner region of at least one of the compression springs. In one non-limiting design, the spring guide is designed to fully or partially extend the full longitudinal length of the spring when the spring is in a compressed position in the housing of the spring system. In still another and/or alternative embodiment of the invention, the spring guide at least partially functions as a stop to limit the amount of compression of one or more compression springs in the spring system. The length of the spring guide can be selected to at least partially set the fully compressed position of the spring system. In this arrangement, the spring guide can be used to prevent or inhibit over compression of one or more compression springs in the spring system and thereby extend the life of the spring system and/or maintain the proper operating conditions of the spring system. In one aspect of this embodiment, the spring guide can function as a damper to inhibit or prevent damage to the components of the spring system during rapid compression of the spring system. In one non-limiting design, the end of the spring guide can include a compressible or semi-compressible end to absorb force upon contact via compression.

In accordance with still another and/or alternative aspect of the present invention, the spring system includes a spring rod which is adapted to extend and retract relative to a housing. The extension of the compression springs impart a force to the parts connected to the ends of the rod and housing and, advantageously, multiple end configurations can be used to adapt the spring rod to a variety of mounting applications. The encased compression springs minimize load losses over time. In one embodiment of the invention, the housing has an internal chamber that is design to encase the one or more compression springs of the spring system. Typically the shape of the internal chamber is similar in shape to shape of one or more compression springs; however, this is not required. The cross-sectional shape and size of the internal chamber is selected to enable the one or more compression springs to be compressed and uncompressed during the operation of the spring system. The cross-sectional shape and size of the internal chamber can also be selected so as to inhibitor prevent buckling of one or more compression springs during compression or uncompression of the one or more compression springs. In one non-limiting design, the housing has a generally cylindrically shaped internal chamber. In another and/or alternative embodiment of the invention, the exterior shape of the housing is selected for a particular application and/or look. In one non-limiting design, the exterior shape of the housing is generally cylindrical. In still another and/or alternative embodiment of the invention, the housing is made of a resilient material. The material of the housing must be durable enough to maintain the one or more compression springs in the internal chamber of the housing during multiple compressions and uncompressions of the one or more compression springs. The exterior portion of the housing must also be durable enough to withstand the operating environment of the spring system. Typically the housing is made of a metal material and/or a plastic material; however, other materials can be used. As can be appreciated, the external surface of the housing can include a protective coating (e.g., polymer coating, paint, etc.) to inhibit or prevent corrosion, scratches and/or other types of damage to the housing. In still another and/or alternative embodiment of the invention, the housing includes an end connector connected to one end of the housing. The end connector is designed to connect one end of the housing to a structure that incorporated the use of the spring system. In one aspect of this embodiment, the end connector is interchangeable with another type of end connector to enable the end of the housing to be connected to variety of structures in a variety of ways. In yet another and/or alternative embodiment of the invention, the housing includes one or more closure connectors that are used to facilitate in maintaining the internal components of the spring system within the internal chamber of the housing. The one or more closure connectors can be designed to be removable to allow for maintenance and/or repair of one or more components in the internal chamber of the spring system. In such a design, the one or more closure connectors can include, but are not limited to, set screws. Alternatively, the one or more closure connectors can be designed to be unremovable. In such a design, the one or more closure connectors can include, but are not limited to, rivets. In still yet another and/or alternative embodiment of the invention, the spring rod has a cross-sectional size and shape to enable the spring rod to move within the internal chamber of the housing. In one non-limiting design, the spring rod has a generally cylindrically shaped body having a diameter that is less than the diameter of a generally cylindrically shaped internal chamber of the housing. In a further and/or alternative embodiment of the invention, the spring rod is formed a resilient and durable material to enable the spring rod to operate without failure during the selected life of the spring system. The spring rod can be solid, or include one or more hollow inner chambers. The spring rod can have a uniform or non-uniform outer shape. In one non-limiting design, the spring rod includes a generally solid body having a generally cylindrical shape and formed of a metal and/or plastic material. As can be appreciated, the external surface of the spring rod can include a protective coating (e.g., polymer coating, paint, etc.) to inhibit or prevent corrosion, scratches and/or other types of damage to the housing. Additionally or alternatively, the external surface of the housing can include a lubricative coating (e.g., Teflon and/or other polymer coating, etc.) to facilitate in the movement of the spring rod in the internal chamber of the housing. As can be further appreciated, a lubricant (e.g., oil, grease, silicon, etc.) can be inserted in the internal chamber of the housing to facilitate in the movement of the spring rod in the internal chamber of the housing. In a further and/or alternative embodiment of the invention, the spring rod includes a top end fastener adapted to be connected to a top connector. The top connector is designed to connect one end of the spring rod to a structure that incorporates the use of the spring system. In one aspect of this embodiment, the top connector is interchangeable with another type of top connector to enable the end of the spring rod to be connected to variety of structures in a variety of ways. The top end fastener of the spring rod can be designed to be permanently connected or removably connected to the top connector. In one non-limiting design, the top end fastener includes a threaded section that enables a top connector be to removably connected to the top end fastener.

In accordance with still another and/or alternative aspect of the present invention, the spring system includes one or more rod guides that at least partially guide the movement of the spring rod within the internal chamber of the housing. The one or more rod guides are designed to prevent or inhibit side loading of one or more of the compression springs during the compression or uncompression of one or more of the compression springs. In one embodiment of the invention, one end of spring rod is directed connected or interconnected to a rod guide. In another and/or alternative embodiment of the invention, both ends of the spring rod are directly connected or interconnected to the rod guide. In still another and/or alternative embodiment of the invention, the body of the spring rod includes one or more rod guides. In yet another and/or alternative embodiment of the invention, at least one rod guide has a cross-sectional shape and size that closely matches the cross-sectional shape and size of the internal chamber of the housing. In one non-limiting example, the cylindrically shaped internal chamber has a diameter X and at least a portion of the rod guide has a circular cross-sectional shape that is the same as or slightly less than X. In this non-limiting design, the thickness of the circular cross-sectional shape is sufficient to maintain the rod guide in a proper orientation in the internal chamber of the housing as the spring rod moves within the internal chamber. This thickness is more important when the rod guide moves with the spring rod in the internal chamber. In still yet another and/or alternative embodiment of the invention, at least one rod guide has an upper and lower surface wherein the upper surface is directly connected or interconnected to the spring rod and the lower surface directly or indirectly engages one or more compression springs. In a further and/or alternative embodiment of the invention, at least one rod guide has an upper and lower surface wherein the upper surface is directly connected or interconnected to the spring rod and the lower surface directly connects or interconnects with at least one spring guide. In a still further and/or alternative embodiment of the invention, at least one rod guide includes a stop surface adapted to directly or indirectly engage a portion of the housing or a component in the internal chamber of the housing to thereby prevent further movement of the rod guide as the rod guide moves with the spring rod to an extended position. The stop surface thus defines the fully extended position of the spring rod. In one aspect of this embodiment, the stop surface includes a compressible material that at least partially absorbs a force as the stop surface directly or indirectly engages a portion of the housing or a component in the internal chamber of the housing. One non-limiting material is a rubber material; however, other materials can be used. As can be appreciated, the stop surface need not include a compressible material. If a damping effect is desired or required prior to the stop surface directly or indirectly engage a portion of the housing or a component in the internal chamber of the housing, a spring and/or other compressible material can be placed between the stop surface and the end of the housing. In a still yet further and/or alternative embodiment of the invention, at least one rod guide is made of a durable and resilient material. Such materials include, but are not limited to, plastic, metal, rubber and the like.

In accordance with still another and/or alternative aspect of the present invention, the spring system includes a fluid control system within the internal chamber of the housing that is designed to at least partially control the rate of the spring rod moving between an extended and nonextended position and/or an nonextended to extended position. In the spring system arrangement disclosed in U.S. patent application Ser. No. 10/056,941 filed Jan. 28, 2002, which is incorporated herein by reference, the spring system did not include any features to control the speed of uncompression of the one or more compression springs during extension of the spring system. In this aspect of the present invention, the flow of a fluid in the internal chamber of the housing is controlled to in part control the speed of uncompression of the one or more compression springs during extension of the spring system. The fluid can be a gas and/or a liquid. In one non-limiting design, the fluid is a gas (e.g., nitrogen, air, inert gas, etc.). Typically the selected fluid does not adversely affect the internal components of the spring system. In one embodiment of the invention, the internal chamber of the housing is divided into at least two sub-chambers by at least one movable component of the spring system. The movable component is designed to at least partially regulate the flow of fluid between at least two of the sub-chambers. This regulation of fluid flow at least partially controls the speed of uncompression of the one or more compression springs during extension of the spring system. In one aspect of this embodiment, the movable component includes a rod guide. In one non-limiting design of this aspect, the rod guide is directly or indirectly connected to one end of a spring rod and moves within the internal chamber as the spring rod moves between an extended and nonextended position. As such, the rod guide simulates a piston in the internal chamber of the housing. In another and/or alternative aspect of this embodiment, the movable component includes a valve system that at least partially regulates the flow of fluid between two ends of the movable component. In another and/or alternative embodiment of the invention, the housing of the spring system includes one or more seals to control the fluid flow into and/or out of the internal chamber of the housing. In one aspect of this embodiment, one or both ends of the housing include a sealing system to inhibit or prevent fluid from flowing into and/or out of the internal chamber of the housing. In another and/or alternative aspect of this embodiment, the housing includes one or more openings to allow fluid to enter and/or exit the internal chamber of the housing.

In accordance with yet another and/or alternative aspect of the present invention, the fluid control system within the internal chamber of the housing regulates fluid between at least two sub-chambers and substantially prevents fluid from flowing into or out of the internal chamber. In this arrangement, a seal is positioned about the spring rod at the end of the housing from which the spring rod extends. The seal is designed to inhibit or prevent fluid flowing into or out of the internal chamber of the housing when the spring rod moves between an extended and nonextended position. One or more seals such as, but not limited to, sealing rings can be used to seal the end of the housing. The movable component includes a valve system to at least partially regulate the flow of fluid between at least two sub-chambers as the movable component and spring rod move within the internal chamber. In one embodiment, the movable component includes a seal about the outer perimeter of the movable component to inhibit or prevent fluid from flowing about the outer perimeter of the movable component as the movable component moves within the internal chamber. In another and/or alternative embodiment, the movable component includes one or more openings about the outer perimeter of the movable component to allow fluid to flow about the outer perimeter of the movable component as the movable component moves within the internal chamber. In still another and/or alternative embodiment, the movable component includes one or more openings spaced from the peripheral edge of the movable component to allow fluid to flow through the movable component as the movable component moves within the internal chamber. In one aspect of this embodiment, the movable component includes at least two openings spaced from the peripheral edge of the movable component. In one non-limiting design, one opening allow for a greater fluid flow rate through the opening than one other opening. In another and/or alternative non-limiting design, at least two openings allow for substantially the same fluid flow rate through the two openings. In another and/or alternative aspect of this embodiment, at least one of the openings includes a one way valve to allow fluid to flow in one direction and to inhibit or prevent fluid to flow in an opposite direction. In one non-limiting design, the one way valve inhibits or prevents fluid flow through the valve as the spring rod moves to an extended position and the one or more compression springs become uncompressed. In such a design, the one way valve can cause the rate of movement of the spring rod to the extended position to slow. In another and/or alternative non-limiting design, the one way valve allows fluid flow through the valve as the spring rod moves to a nonextended position and the one or more compression springs become compressed. In such a design, the one way valve allows the rate of movement of the spring rod to the nonextended position to be faster than in the opposite direction. As can be appreciated, as the spring rod moved to the nonextended position, the one or more compression springs are compressed thereby resisting movement of the spring rod to a nonextended position and thereby slowing the movement of the spring rod to such position.

In accordance with still yet another and/or alternative aspect of the present invention, the fluid control system within the internal chamber of the housing regulates fluid between at least one sub-chamber and allows fluid to flow into and/or out of the internal chamber. In this arrangement, the movable component includes a valve system to at least partially regulate the flow of fluid between at least two sub-chambers as the movable component and spring rod move within the internal chamber. In one embodiment, the movable component includes a seal about the outer perimeter of the movable component to inhibit or prevent fluid from flowing about the outer perimeter of the movable component as the movable component moves within the internal chamber. In still another and/or alternative embodiment, the movable component includes one or more openings spaced from the peripheral edge of the movable component to allow fluid to flow through the movable component as the movable component moves within the internal chamber. In one aspect of this embodiment, at least one of the openings includes a one way valve to allow fluid to flow in one direction and to inhibit or prevent fluid to flow in an opposite direction. In one non-limiting design, the one way valve inhibits or prevents fluid flow through the valve as the spring rod moves to an extended position and the one or more compression springs become uncompressed. In such a design, the one way valve can cause the rate of movement of the spring rod to the extended position to slow. In another and/or alternative non-limiting design, the one way valve allows fluid flow through the valve as the spring rod moves to a nonextended position and the one or more compression springs become compressed. In such a design, the one way valve allows the rate of movement of the spring rod to the nonextended position to be faster than in the opposite direction. As can be appreciated, as the spring rod moved to the nonextended position, the one or more compression springs are compressed thereby resisting movement of the spring rod to a nonextended position and thereby slowing the movement of the spring rod to such position. In still another and/or alternative embodiment of the invention, fluid is allowed to flow into and/or out of a sub-chamber by flowing about the spring rod in the region where the spring rod passes through an end of the housing. The size of the opening about the spring rod is selected to allow for a certain fluid flow rate out of an upper sub-chamber as the spring rod moves to an extended position. In one non-limiting design, the upper chamber is formed between the movable component and the end of the housing through which the spring rod passes. As the spring rod moves to an extended position, the upper sub-chamber reduces in size and causes the fluid in the chamber to be forced out through the opening about the spring rod. The fluid is not allowed to flow in a lower sub-chamber due to the one way valve in the movable component. The low rate of the fluid through the opening about the spring rod at least partially controls the rate at which the spring rod moves to an extended position. As such, a smaller opening will reduce the rate of movement and a larger opening will allow for a faster rate of movement. In yet another and/or alternative embodiment of the invention, fluid is allowed to flow into and/or out of a sub-chamber by flowing through one or more openings in the housing. The size of the one or more openings in the housing is selected to allow for a certain fluid flow rate out of an upper sub-chamber as the spring rod moves to an extended position. In one non-limiting design, the upper chamber is formed between the movable component and the end of the housing through which the spring rod passes. As the spring rod moves to an extended position, the upper sub-chamber reduces in size and causes the fluid in the chamber to be forced out through the one or more openings in the housing. The fluid is not allowed to flow in a lower sub-chamber due to the one way valve in the movable component. The low rate of the fluid through the one or more openings in the housing at least partially controls the rate at which the spring rod moves to an extended position. As such, a smaller opening will reduce the rate of movement and a larger opening will allow for a faster rate of movement.

In accordance with a further and/or alternative aspect of the present invention, a compression spring rod in accordance with the invention is particularly adapted for lifting or pivoting one component relative to another component at a controlled rate. In accordance with one embodiment of the invention, a lift mechanism for hinged covers and the like that operates automatically upon release of the cover, or a lift mechanism for a loaded platform wherein the platform is elevated, progressively, as the load thereon is reduced. Advantageously, the compression spring assembly applies a constant and controlled force to open the cover or lift the platform. The mechanism is able to support significant loads while maintaining strength over a greater number of operating cycles than existing pneumatic or gas spring designs. In accordance with another and/or alternative embodiment of the invention, a purely mechanical compression rod assembly that can yield controllable forces over a long period of use and control the spring forces during both extension and compression is used.

In accordance with a still further and/or alternative aspect of the present invention, a compression spring rod is comprised of multiple compression springs. The compression spring rod assembly includes a rod which is adapted to extend and retract relative to a housing. In embodiment of the invention, the compression springs will build potential force as the springs are compressed, and release that force once the springs are allowed to expand. This extension of the springs imparts a force to the parts connected to the ends of the rod and housing and, advantageously, multiple end configurations can be used to adapt the spring rod to a variety of mounting applications. The compression springs of a spring rod according to the invention are interrelated to produce a linear load versus deflection curve. The encased springs minimize load losses over time, and the mechanism does not contain any fluid or gases within the lift body. This advantageously eliminates the inevitable problem of leakage and subsequent loss of utility.

It is accordingly an outstanding object of the present invention to provide an improved compression spring rod for exerting an operating force on a displaceable member at a controlled rate.

Another and/or alternative object of the present invention is the provision of a compression spring rod that supplies a consistent force over an extended period of time and maintains strength over a greater number of cycles compared to compression spring rods heretofore available.

Still another and/or alternative object of the present invention is the provision of a compression spring rod having at least two compression springs interrelated to produce a linear load versus deflection curve.

Yet another and/or alternative object of the present invention is the provision of a compression spring rod having at least two compression springs interrelated to minimize load losses over time.

Still yet another and/or alternative object of the present invention is the provision of a mechanical compression spring rod assembly that provides an operating force that increases at a linear rate.

A further and/or alternative object of the present invention is to provide a mechanical compression spring assembly that can accommodate, selectively, multiple end configurations, thus adapting the assembly for mounting in a wide variety of use applications.

Still a further and/or alternative object of the present invention is the provision of a mechanical compression spring rod assembly that has a controlled rate of extension from a compressed state.

Another and/or alternative object of the present invention is the provision of a an improved compression spring rod for exerting an operating force on a displaceable member at a controlled rate.

Still another and/or alternative object of the present invention is the provision of a compression spring rod that supplies a consistent force over an extended period of time and maintains strength over a greater number of cycles compared to compression spring rods heretofore available.

Yet another and/or alternative object of the present invention is the provision of a compression spring rod having at least two compression springs interrelated to produce a linear load versus deflection curve.

Still yet another and/or alternative object of the present invention is the provision of a compression spring rod having at least two compression springs interrelated to minimize load losses over time.

A further and/or alternative object of the present invention is the provision of a mechanical compression spring rod assembly that provides an operating force that increases at a linear rate.

Still a further and/or alternative object of the present invention is the provision of a mechanical compression spring assembly that can accommodate, selectively, multiple end configurations, thus adapting the assembly for mounting in a wide variety of use applications.

These and other objects and advantages will become apparent from the discussion of the distinction between the invention and the prior art and when considering the preferred embodiment as shown in the accompanying drawings.

BRIEF DESCRIPTION OF THE DRAWINGS

FIG. 1 is a longitudinal cross-sectional view of the compression spring rod in the according to the invention in the extended position;

FIG. 2 is a longitudinal cross-sectional view of the compression spring rod in the compressed position;

FIG. 3 is a cross-sectional view taken along line 3-3 of FIG. 2;

FIG. 4 is an exploded perspective view of the valve piston as illustrated in FIG. 3;

FIG. 12 is a side elevation view, partially in section, of a compression spring rod according to another aspect of the invention in the extended position;

FIG. 13 is a longitudinal cross section view of the compression spring rod in the compressed position;

FIG. 19 is a side elevation view, in section, of a spring rod in accordance with a second embodiment of the invention;

FIG. 22 is a side elevation view, in section, of a spring rod in accordance with another embodiment of the invention;

DESCRIPTION OF PREFERRED EMBODIMENTS OF THE INVENTION

Figure 5:
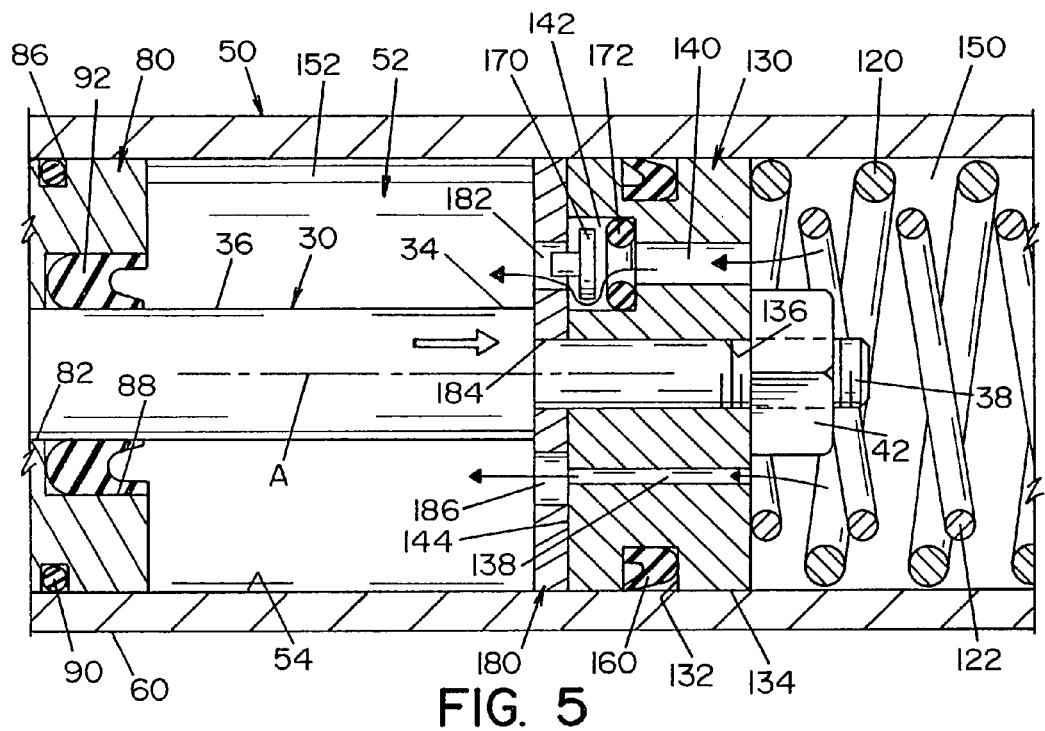
FIG. 5 is an enlarged partial cross-sectional view of the compression spring rod as illustrated in FIG. 1 showing the operation of the piston valve during the movement of the spring rod to a nonextended position.

Referring now in greater detail to the drawings, wherein the showings are for the purpose of illustrating preferred embodiments of the invention only, and not for the purpose of limiting the invention, a compression spring system 20, in accordance with the invention, as shown in FIGS. 1-6, has an axis A and includes a spring rod 30 which is axially extendable and retractable relative to a one-piece tubular housing 50. The housing includes an internal chamber 52 having an inner surface 54, and a mount end 56 and an opposite end 60. Spring rod 30 includes an outer surface 36, an outer end 32 having a threaded end 40, and an inner end 34 having a threaded end 38. Inner end 34 is connected to guide member 130 by a nut 42 which is threaded on threaded end 38.

A first compression spring 120 and a second compression spring 122 are located in internal chamber 52. The two compression springs are oriented such that second compression spring 122 is surrounded by first compression spring 120. The interior surface 54 of internal chamber 52 supports the two compression springs to inhibit or prevent the compression springs from buckling during the compression and expansion of the compression springs.

Housing 50 includes a mounting end 56 and an opposite end 60. Positioned at mounting end 56 is a tail bushing 70. Tail bushing 70 includes a spring surface 74 and a threaded end 72 which extends though an opening in mount end 56. The two compression springs 120 and 122 are axially captured between the spring surface 74 of tail bushing 70 and a guide member 130. Tail bushing 70 is supported in internal chamber 52 of housing 50 by bending the endmost portion of the mount end radially inwardly to define a retaining flange 58. Tail bushing 70 is made of a resilient material to withstand the compressive forces of the two compression springs. The tail bushing also includes a material that forms a seal in the mount end of the housing to inhibit or prevent fluid from entering or exiting the internal chamber. As can be appreciated, the tail bushing can include one or more seals, not shown, to facilitate in sealing the mount end of the housing.

Spring system 20 includes the use of a one-piece housing 50 which facilitates in smooth movement of rod 30 and compression springs 120 and 122 during operation of the spring system. Although not shown, tail bushing 70 can include a neck portion having a diameter sized to be received in the interior of compression spring 122. This neck portion can be used to facilitate in positioning compression spring 122 relative to compression spring 130. Tail bushing 70 has a threaded stud 72 which is received in a threaded recess 102 in a mounting element 100.

Positioned in the open end of outer end 60 of housing 50 is a top bushing 80 having a central opening 82. The central opening is sized to allow spring rod 30 to pass therethrough. Bushing 80 is secured to the housing by set screws 64 having inner ends that pass through side openings 62 in the housing and are received in an annular recess 84 in top bushing 80. The set screws can be designed to be removable or irremovable. Spring rod 30 is slidably supported at end 60 of housing 50 by top bushing 80 by passing through an opening 82. The top bushing, in conjunction with rod guide member 130, facilitates in guiding the movement of the spring rod in internal chamber 52 thereby inhibiting and/or preventing side loading of the two compression springs. Bushing 80 includes an outer groove 86 that receives a sealing ring 90. Sealing ring 90 inhibits or prevents a fluid such as a gas from flowing between inner surface 54 of internal chamber 52 and the outer surface of bushing 80. Bushing 80 also includes a lower central cavity 88 which receives a rod seal 92. Rod seal 92 inhibits or prevents a fluid such as a gas from flowing between outer surface 36 of spring rod 30 and opening 82 in bushing 80. Seals 90 and 92 are designed to seal end 60 of housing 50 from fluid flow into or out of internal chamber 52 during the use of spring system 20.

Rod end 32 of spring rod 30 includes a threaded stud 40 which is received in a threaded recess 112 provided therefor in a mounting element 110. Mounting elements 100 and 110 have openings 104 and 114 therethrough, respectively, for receiving a variety of different mounting components common in the industry including, for example, pins, bolts, screws, hooks, rings, swivels, and the like. Advantageously, the threaded end 72 and threaded stud 40 at opposite ends of the spring system provide for accommodating the use of different mounting elements than those shown so as to modify the assembly for use in a variety of structural environments.

Guide member 130 is mounted to spring rod 30 and is slidably positioned in internal chamber 52 of housing 50 as spring rod 30 moves relative to housing 50. Guide member 130 is made of suitable material to facilitate such sliding movement. Lubrication can be provided in internal chamber 52 to facilitate in the sliding movement of guide member 130. As will be appreciated from the foregoing description, guide member 130 and top bushing 80 guide support rod 30 for reciprocation in internal chamber 52 of housing 50 so as to maintain minimal breakaway forces for rod 30. Additionally, guide member 130 and top bushing 80 facilitate in maintaining spring rod 30 coaxial with axis A and decrease the effect of side loading on the compression springs.

As described above, tail bushing 70 and top bushing 80 form a seal at each end of housing 50 to inhibit or prevent fluid from entering or escaping from internal chamber 52 when the spring rod reciprocates in the internal chamber or remains in a stationary position. The rod guide member includes valving, that will be described below, which regulates the flow of fluid in the internal chamber of the housing so as to control the rate at which the spring rod moves from a non-extended to extended position. Rod guide member 130 includes an annular slot 132 designed to receive a seal 160. Seal 160 is design to inhibit or prevent fluid from passing between inner surface 54 of internal chamber 52 and the outer surface 134 of rod guide 130. As such, the rod guide member resembles a plunger in that it divides internal chamber 54 into a lower sub-chamber 150 between rod guide member 130 and tail bushing 70 and an upper sub-chamber 152 between top bushing 80 and rod guide member 130. Rod guide member includes three openings passing longitudinally through the rod guide member. A central opening 136 is designed to receive threaded end 38 of spring rod 30. As stated above, the threaded end passes through the central opening of the rod guide member and nut 42 is then threaded thereon to connect the rod guide member to the spring rod. The rod guide member also includes two fluid openings 138 and 140. Fluid opening 138 is shown to have a smaller diameter than fluid opening 140; however, this is not required. The smaller diameter of fluid opening 138 results in a lower maximum fluid flow rate through the opening than the maximum fluid flow rate of fluid opening 140. Fluid opening 140 includes a valve recess 142 that is designed to receive a valve 170 and a valve seal 172. A guide cover 180 in positioned over the top surface 144 of rod guide member 130 to maintain valve 170 in valve recess 142. The guide cover can be secured to the rod guide member in a number of ways (e.g., adhesive, melting, etc.). The guide cover includes three openings 182, 184 and 186 that are axially aligned to fluid opening 140, central opening 136 and fluid opening 138.

The operation of the of guide member in the during the reciprocation of the spring rod will now be described. Referring now to FIGS. 2 and 5, the arrow indicates the movement of the spring rod into a nonextended position. As the spring rod moves in the direction of the arrow, the rod guide member is moved toward tail bushing 70 in the internal chamber thereby resulting in the compression of compression springs 120 and 122. As stated above, the spring system, through the multiple spring rate characteristics of compression springs 120 and 122, serves to provide smooth extension forces to the movement of spring rod 30 from a retracted or nonextended position to an extended position thereof relative to housing 50. Depending upon the application, the appropriate load versus deflection for the spring system can be determined and the corresponding physical and elastic properties of the combination of compression springs 120 and 122 can then be ascertained. The compression springs 120 and 122 can each be fabricated from spring material, such as music wire, and, for example, ASTM A228 or 302 stainless steel.

Compression springs 120 and 122 have a different stress and strain characteristic. If the two springs are considered to be a one-dimensional object, the only stress on the compression springs will be extensional (or compressional, which will be the negative of extensional) and the units of stress will be force per unit of extension. Within a range of compression, each spring obeys "Hook's Law", which states that for forces in a defined range, the stretch of a material is proportional to the applied force:

$$F=-k\Delta L$$

The proportionality constant, k, is known as the spring constant with dimensions of force over length, and $\Delta L$ is the amount of compression. The negative sign indicates that the force is in the opposite direction of extension: if the spring is extended, the force tries to restore it to its original length. Likewise, if the spring is compressed ($\Delta L<0$), the force attempts to expand the spring, again to its original length. The spring constant depends on both physical and elastic properties of the material being stretched. Hook's Law is fairly intuitive at a basic level, and can be illustrated by everyday experience in which it is known that a thin wire will stretch more than a thick wire or rod of the same material when the same stretching force is applied to both. The formula $U=\frac{1}{2}k(\Delta L)^2$, gives the work of extension (U) or alternatively, the amount of potential energy stored in the spring.

Compression spring 122 has a free length which is greater than the free length of compression spring 120, and compression spring 122 has an outer diameter that is smaller than that of compression spring 120. Also, the wire diameter of compression spring 122 is less than that of compression spring 120, and the spring rate of compression spring 122 is less than that of compression spring 120. As an example of one particular application, the specific physical characteristics of compression spring 122 are: wire diameter 0.055", inside diameter 0.544", outside diameter 0.654", free length 17.2", and a spring rate of 0.95 lbs./inch; and the physical characteristics of compression spring 120 are: wire diameter 0.081", inside diameter 0.675", outside diameter 0.837", free length 13.8", and a spring rate of 3.37 lbs./inch. Compression springs 120 and 122 are oppositely wound in internal chamber 52 and that this winding interrelationship together with the dimensional characteristics of the compression springs produces the combined linear load versus deflection graph. The different free lengths of springs 120 and 130 is one component that helps to control the forces and stabilize the rod guide member 130 and spring rod 30 during displacement of the spring rod in the internal chamber. In this respect, the longer spring 122 is, in the free state of the spring 120, slightly compressed to the length of the latter spring and, therefore, exerts a stabilizing force on the spring rod and rod guide to thereby reduce or eliminate free play during initial and terminal displacement of the spring rod during use.

As shown in FIGS. 2 and 5, the fluid, such as air, in the lower sub-chamber 150 flows through rod guide member 130 via fluid openings 138 and 140 as the rod guide member moves toward tail bushing 70. Valve 170 is designed and oriented in valve recess 142 to move off of valve seal 172 by fluid pressure as the fluid moves from the lower sub-chamber 150, through fluid opening 140 and into upper sub-chamber 152. Tail bushing 70 inhibits or prevents fluid from flowing out through mount end 56 of housing 50 thus requiring fluid in lower sub-chamber 150 to flow into upper sub-chamber 152 as the pressure increases in the lower sub-chamber due to the movement of the rod guide member. Seal 160 about the outer surface of the rod guide member inhibit or prevents fluid from flowing between outer surface 134 of rod guide member 130 and inner surface 54 of internal chamber 52. Nut 42 that is threaded on threaded end 38 of spring rod 30 also inhibits or prevents fluid from flowing through central opening 136 of rod guide member 130. As such, essentially all the fluid flowing from lower sub-chamber 150 to upper sub-chamber 152 flows through fluid openings 138 and 140 of rod guide member 130 as indicated by the arrows. The open position of valve 170 results in the rod guide member not significantly altering or controlling the rate of movement of the rod guide member toward tail bushing 70 as a force is being applied to end 32 of spring rod 30. The two compression springs 120 and 122 and the degree of force being applied to end 32 of spring rod 30 are the principle factors that determine the rate at which the rod guide member moves toward tail bushing 70. As can be appreciated, the size of fluid openings 138 and 140 can be selected to alter the rate of movement of the rod guide member toward tail bushing 70 as a force is being applied to end 32 of spring rod 30. A lubricant is typically applied to the inner surface of internal chamber 52 to facilitate in the movement of the rod guide member in the internal chamber. The lubricant can also have a sealing effect to inhibit fluid flow between outer surface 134 of rod guide member 130 and inner surface 54 of internal chamber 52.

Figure 6:
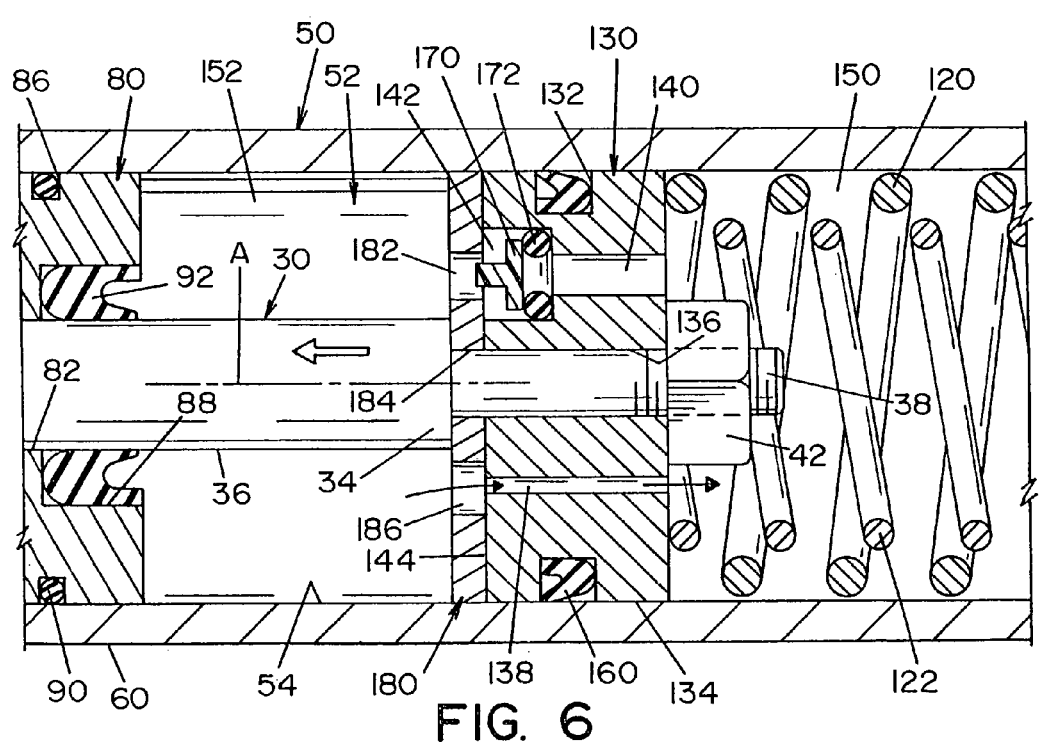
FIG. 6 is an enlarged partial cross-sectional view of the compression spring rod as illustrated in FIG. 1 showing the operation of the piston valve during the movement of the spring rod to an extended position.

Referring now to FIG. 6, The movement of the rod guide member is away from tail bushing 70 and toward top bushing 80. The movement of the rod guide member in this direction represents the spring rod moving toward an extended position. As the rod guide member moves toward top bushing 80, the size of upper sub-chamber decreases and the fluid pressure within the upper sub-chamber increases. Seal ring 90 and rod seal 92 inhibit or prevent fluid from flowing out of upper sub-chamber 152 through end 60 of housing 50. In addition, seal 160 positioned on the outer surface of rod guide member 130 inhibits or prevents fluid from flowing between outer surface 134 of rod guide member 130 and inner surface 54 of internal chamber 52. As such, the compressed fluid in upper sub-chamber 152 attempts to flow through fluid openings 138 and 140 of rod guide member 130. Valve 170 is designed such that as fluid begins to flow from the upper sub-chamber through fluid opening 140, the fluid flow causes valve 170 to engage valve seal 172 thereby inhibiting or preventing fluid flow through fluid opening 140. The closure of valve 170 results in the fluid in upper sub-chamber 152 to flow into lower sub-chamber 150 via fluid opening 138. Fluid opening 138 allows fluid to freely flow through the opening into lower sub-chamber 150. The diameter of fluid opening 138 is selected to allow for a certain fluid flow rate. The selected fluid flow rate results in a pressure buildup in upper sub-chamber 152 as the rod guide member moves toward top bushing 80. An initial rapid movement of the rod guide member toward top bushing 80 will result in a rapid pressure increase in upper sub-chamber 152. The size of fluid opening 138 is selected so as to allow for this high pressure build up and slower pressure release, thereby resulting in the high pressure in the upper sub-chamber exerting a countering force to the compression springs and resulting in a slower movement of the rod guide member toward top bushing 80. The slower movement of the rod guide member to toward top bushing 80 results in a slower movement of the spring rod to an extended position. The size of fluid opening 138 is selected to thereby control the rate of movement of the spring rod from a nonextended to an extended position. In essence, the bleed rate of the fluid through fluid opening 138 at least partially controls the rate extension of the spring rod 30. As can be appreciated, fluid opening can include a valve arrangement to regulate fluid flow through the fluid opening. It can also or alternatively be appreciated that fluid opening 140 can be absent a valve arrangement and the size of the two fluid openings are used to control the rate of movement of the spring rod in the internal chamber. In this arrangement or other arrangements, it can be appreciated that a single fluid opening or three or more fluid openings can be used in the rod guide member.

Figure 11:
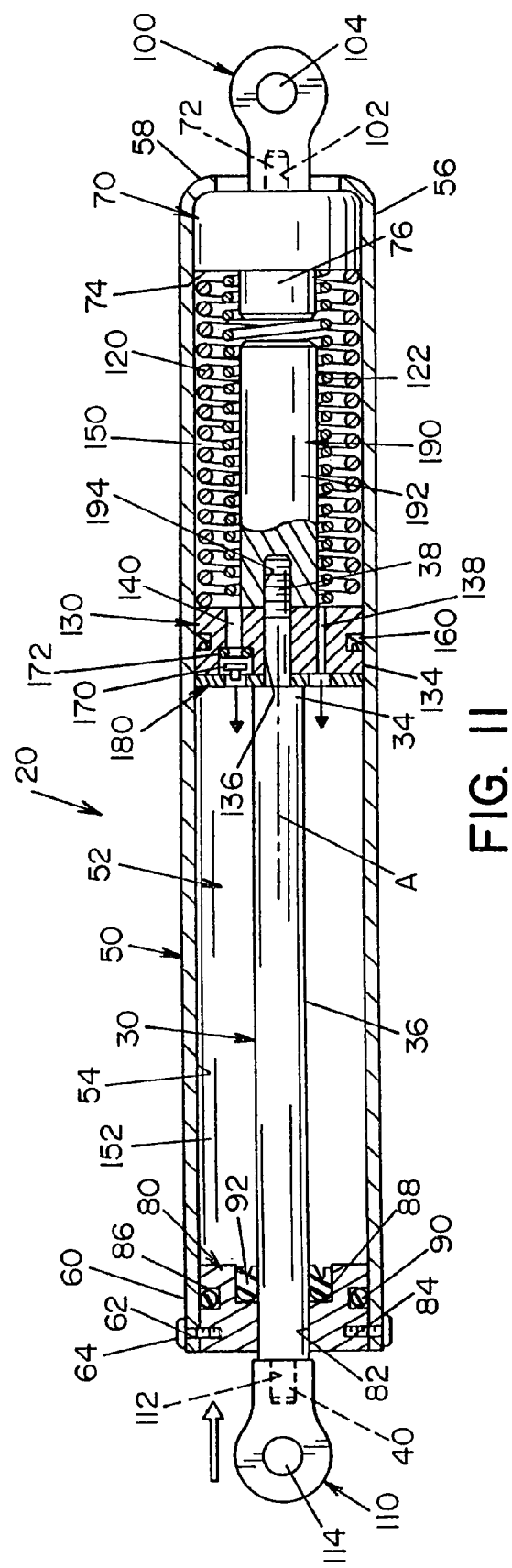
FIG. 11 is a longitudinal cross-sectional view of an alternative embodiment of the compression spring rod as illustrated in FIG. 1.
Figures 14, 15:
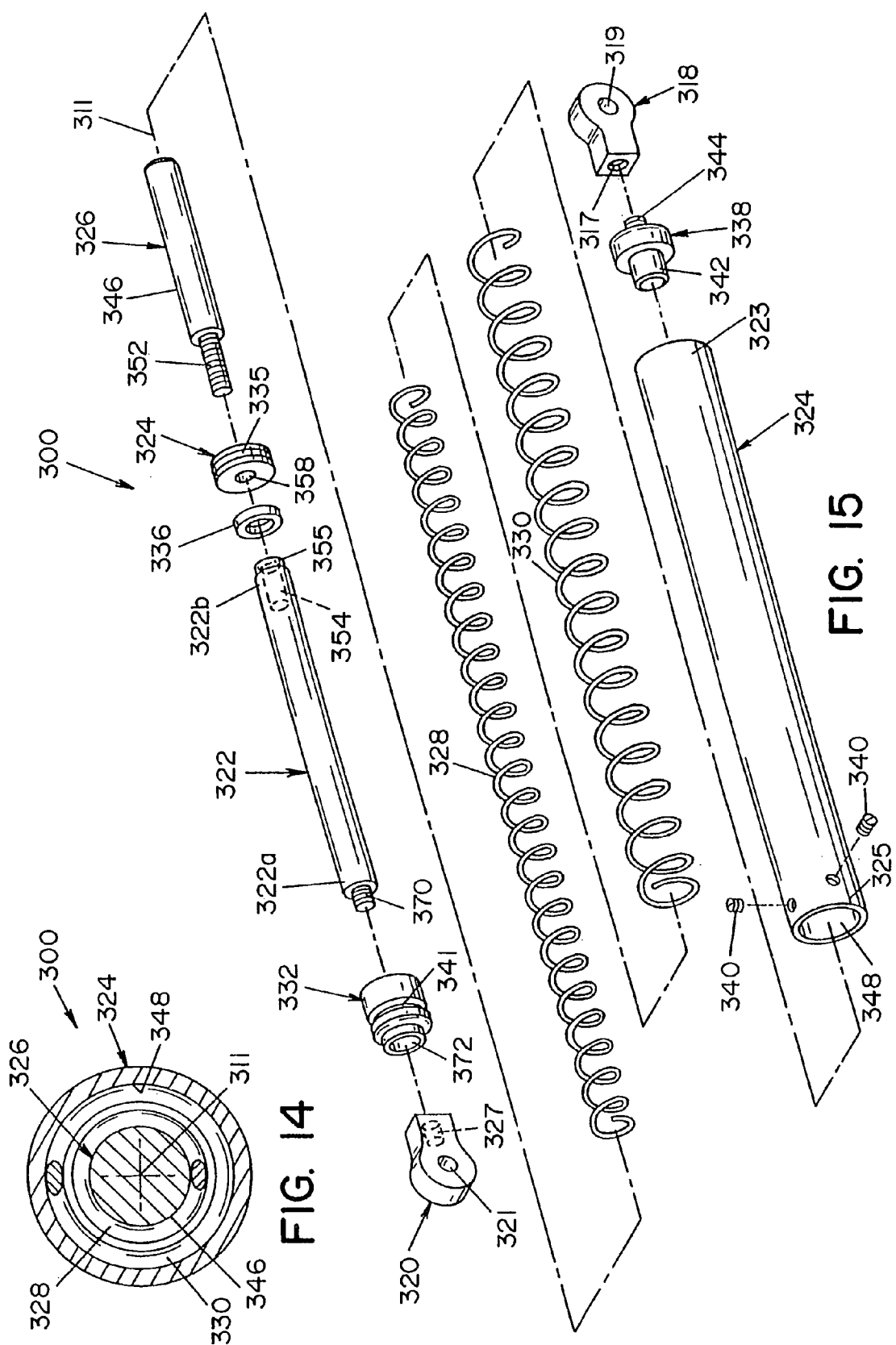
FIG. 14 is a cross sectional view taken along line 3-3 of FIG. 13.
FIG. 15 is an exploded perspective view of the component parts of the compression spring rod shown in FIGS. 12-14.

Referring now to FIG. 11, an alternative embodiment of FIG. 1 is illustrated. The components and arrangement of the components of the spring system 20 as illustrated in FIG. 11 are the same as in FIG. 1 except that a guide rod 190 is substituted for nut 42 and a modification to the tail bushing. Guide rod 190 extends axially inwardly of end 34 of rod 30 and is surrounded by a compression spring 122 which is supported by the exterior surface 192 of guide rod 190 against buckling. Alignment of compression springs 120 and 122 relative to one another and along axis A is maintained by exterior surface 192 of guide rod 190 in conjunction with the inner surface 54 of internal chamber 52 of housing 50. Guide rod 190 includes a threaded bore 194 which receives threaded end 38 of spring rod 30. Tail bushing 70 includes a spring seat 76 on spring surface 74. Spring seat extends axially inwardly of spring surface 74 and is surrounded by a compression spring 122. The spring seat facilitates in maintaining the compression springs in a proper position at the mount end of the housing. The end of guide rod 190 and the top surface of spring seat 76 can function as a stop which represents the fully non-extended position of the spring rod. A damping spring, not shown can be positioned about spring rod 30 in the upper sub-chamber. The damping spring is designed to begin compression as the guide cover 180 approaches top bushing 80. The damping spring can be used to protect the rod guide member from damage due to rapid and hard contact with the top bushing as the spring rod moves to the fully extended position and/or can function to further slow the extension of the spring rod as it nears the fully extended position. As can further be appreciated, a dual compression spring arrangement could be positioned in the upper sub-chamber to further modify the rate of movement of the spring rod between an extended and non-extended position.

Figure 7:
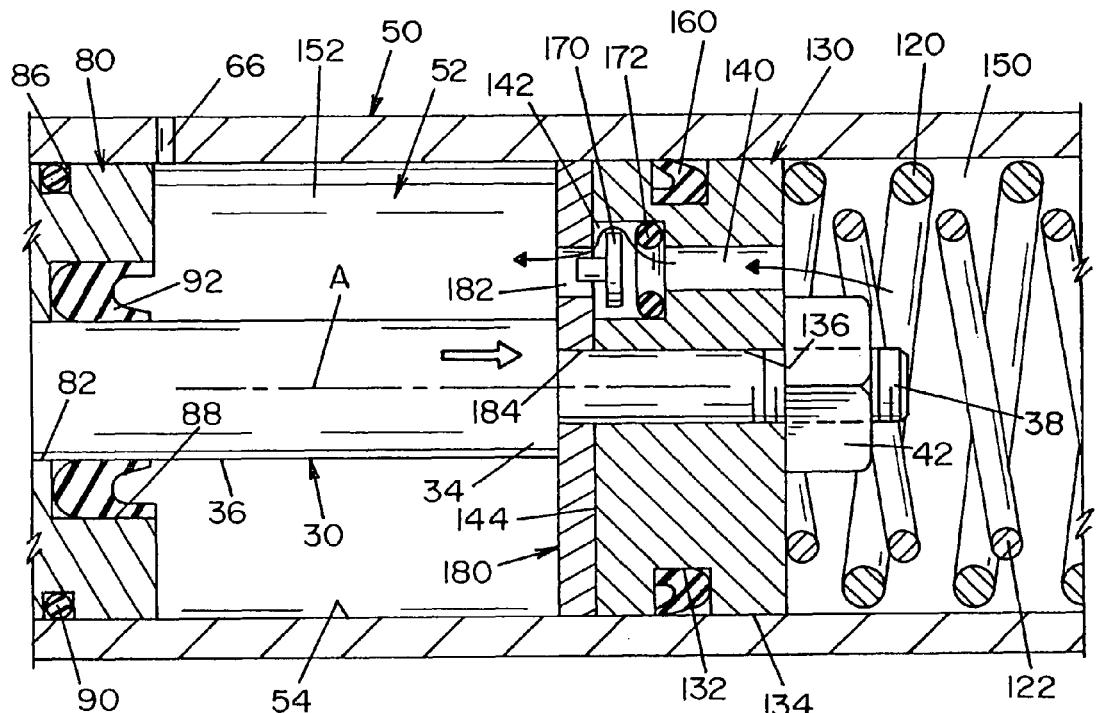
FIG. 7 is an enlarged partial cross-sectional view of an alternative embodiment of the compression spring rod in accordance with the present invention showing the operation of the piston valve during the movement of the spring rod to a nonextended position.
Figure 8:
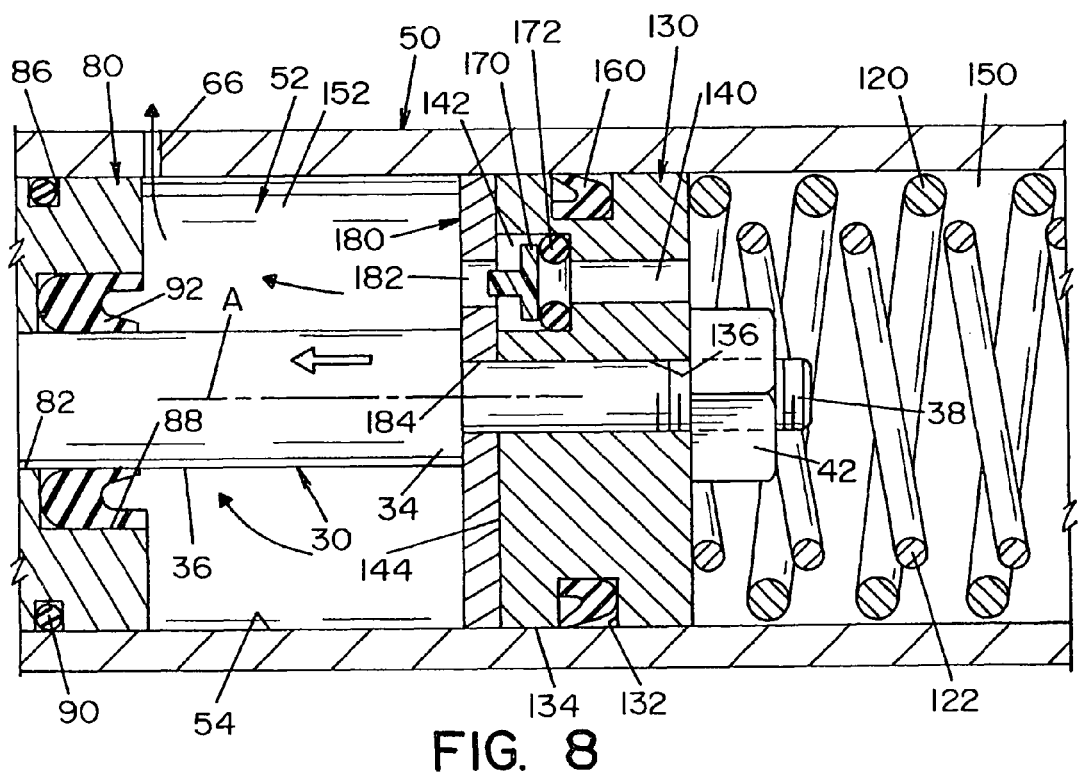
FIG. 8 is an enlarged partial cross-sectional view of the compression spring rod as illustrated in FIG. 7 showing the operation of the piston valve during the movement of the spring rod to an extended position.

Referring now to FIGS. 7 and 8, one alternative embodiment of the invention is illustrated. The arrangement of the components of the spring system of this embodiment as the same as in FIGS. 1-6 except for a modification to the rod guide member, the guide cover and the housing. The rod guide member is modified by the elimination of fluid opening 138. The guide cover is modified by the elimination of opening 186 that corresponded to fluid opening 138 of rod guide member 130. Housing 50 is modified by including an annular opening 66 that provides a fluid passageway between the upper sub-chamber 152 and the exterior of housing 50. As can be appreciated, more than one annular opening can be used. As illustrated in FIG. 7, valve 170 is in an open position as the spring rod moves to a nonextended position as indicated by the arrow. As explained above, as the fluid pressure increases due to the decrease in size of lower sub-chamber 150 caused by the movement of rod guide member 130 toward tail bushing 70, the increased fluid pressure causes valve 170 to be lifted off of valve seal 172 thereby allowing fluid to flow from the lower sub-chamber to the upper sub-chamber as indicated by the arrows. The size of fluid opening 140 is typically selected to allow a sufficient fluid flow rate so as not to impair the movement of the rod guide member toward the tail bushing. As can be appreciated, the size of the fluid opening can be selected to at least partially control the rate at which the rod guide member can move toward the tail bushing. As fluid flows from lower sub-chamber into upper sub-chamber, some fluid may exit through annular opening 66 and/or fluid may enter into upper sub-chamber through the annular opening. Referring now to FIG. 8, the spring rod is illustrated as moving to an extended position as indicated by the arrow. As the rod guide member moves toward top bushing 80, the size of upper sub-chamber 152 decreases thereby resulting in a fluid pressure increase in the upper sub-chamber. The pressure increase causes valve 170 to move toward valve seal 172 thereby inhibiting or preventing fluid to flow through fluid opening 140. As a result, the pressurized fluid is forced out of upper sub-chamber 152 through annular opening 66. The size of annular opening 66 is selected to thereby control the rate of movement of the spring rod from a nonextended to an extended position. As can be appreciated, annular opening can include a valve arrangement to regulate fluid flow through the annular opening. It can also or alternatively be appreciated that fluid opening 140 can be absent a valve arrangement and the size of the fluid opening and the annular opening are used to control the rate of movement of the spring rod in the internal chamber.

Figure 9:
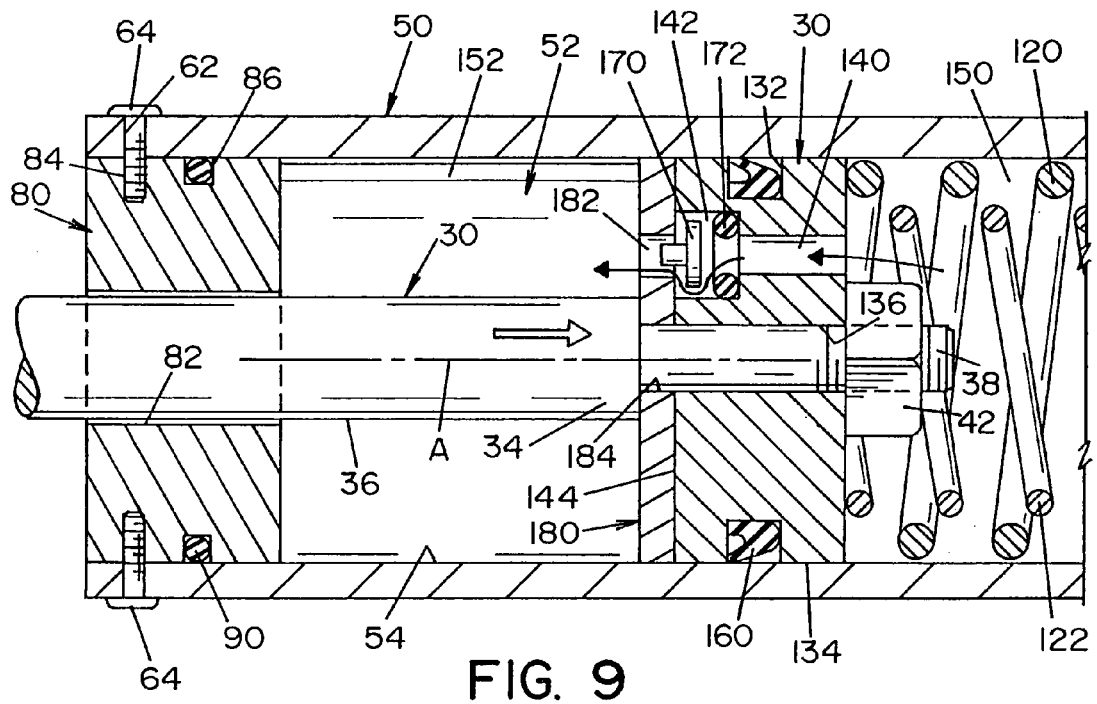
FIG. 9 is an enlarged partial cross-sectional view of an alternative embodiment of the compression spring rod in accordance with the present invention showing the operation of the piston valve during the movement of the spring rod to a nonextended position.
Figure 10:
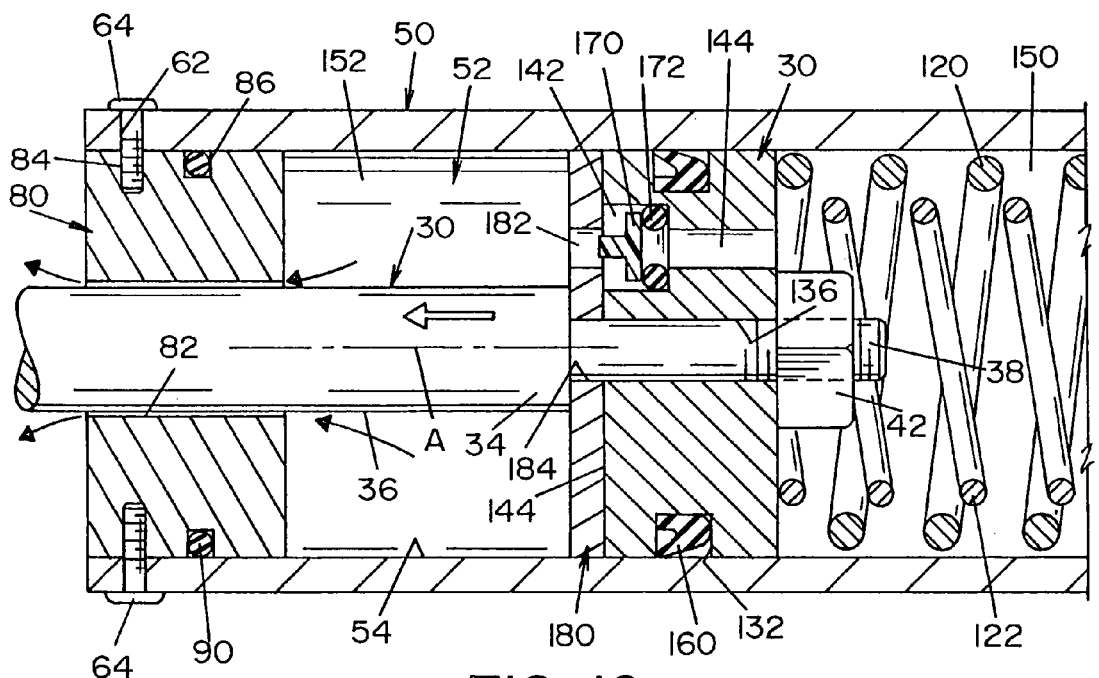
FIG. 10 is an enlarged partial cross-sectional view of the compression spring rod as illustrated in FIG. 9 showing the operation of the piston valve during the movement of the spring rod to an extended position.

Referring now to FIGS. 9 and 10, another alternative embodiment of the invention is illustrated. The arrangement of the components of the spring system of this embodiment as the same as in FIGS. 1-6 except for a modification to the rod guide member and the guide cover similar to that illustrated in FIGS. 7 and 8, and the top bushing. The rod guide member is modified by the elimination of fluid opening 138. The guide cover is modified by the elimination of opening 186 that corresponded to fluid opening 138 of rod guide member 130. Top bushing 80 is modified by the elimination of central cavity 88 and rod seal 92 thereby providing a fluid passageway between the upper sub-chamber 152 and the exterior of housing 50. As illustrated in FIG. 9, valve 170 is in an open position as the spring rod moves to a nonextended position as indicated by the arrow. As explained above, as the fluid pressure increases due to the decrease in size of lower sub-chamber 150 caused by the movement of rod guide member 130 toward tail bushing 70, the increased fluid pressure causes valve 170 to be lifted off of valve seal 172 thereby allowing fluid to flow from the lower sub-chamber to the upper sub-chamber as indicated by the arrows. The size of fluid opening 140 is typically selected to allow a sufficient fluid flow rate so as not to impair the movement of the rod guide member toward the tail bushing. As can be appreciated, the size of the fluid opening can be selected to at least partially control the rate at which the rod guide member can move toward the tail bushing. As fluid flows from the lower sub-chamber into the upper sub-chamber, some fluid may exit through top bushing 80 and/or fluid may enter into the upper sub-chamber through the top bushing. Referring now to FIG. 10, the spring rod is illustrated as moving to an extended position as indicated by the arrow. As the rod guide member moves toward top bushing 80, the size of upper sub-chamber 152 decreases thereby resulting in a fluid pressure increase in the upper sub-chamber. The pressure increase causes valve 170 to move toward valve seal 172 thereby inhibiting or preventing fluid to flow through fluid opening 140. As a result, the pressurized fluid is forced out of upper sub-chamber 152 through top bushing 80 by flowing though opening 82. The size of the space between outer surface 36 of spring rod 30 and the inner surface of opening 82 is selected to thereby control the rate of movement of the spring rod from a nonextended to an extended position.

Figure 18:
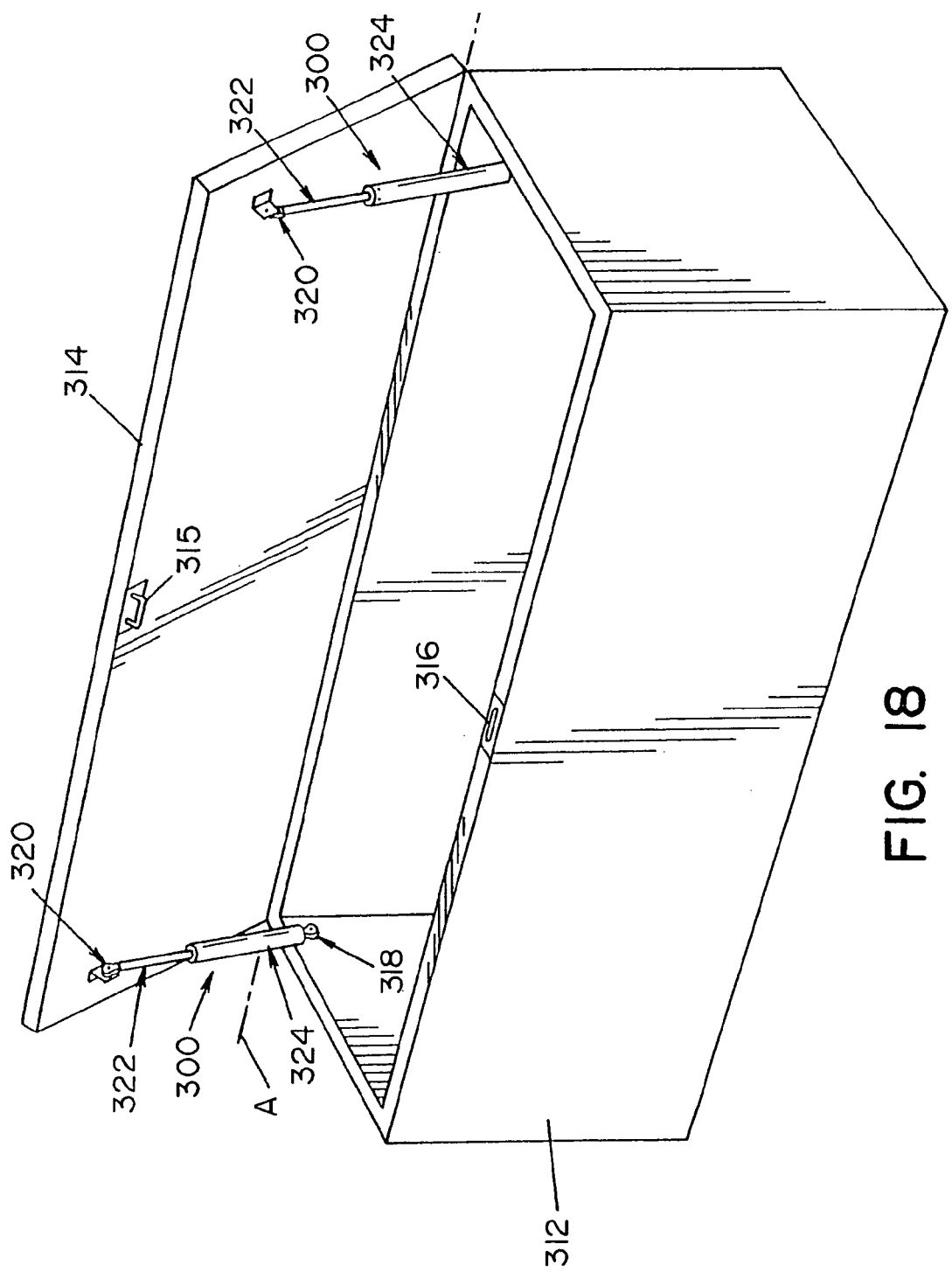
FIG. 18 is a perspective view of a box with a lid pivotable about a horizontal axis and compression spring rod elements shown in FIGS. 12-14 between the box and lid.
Figure 21:
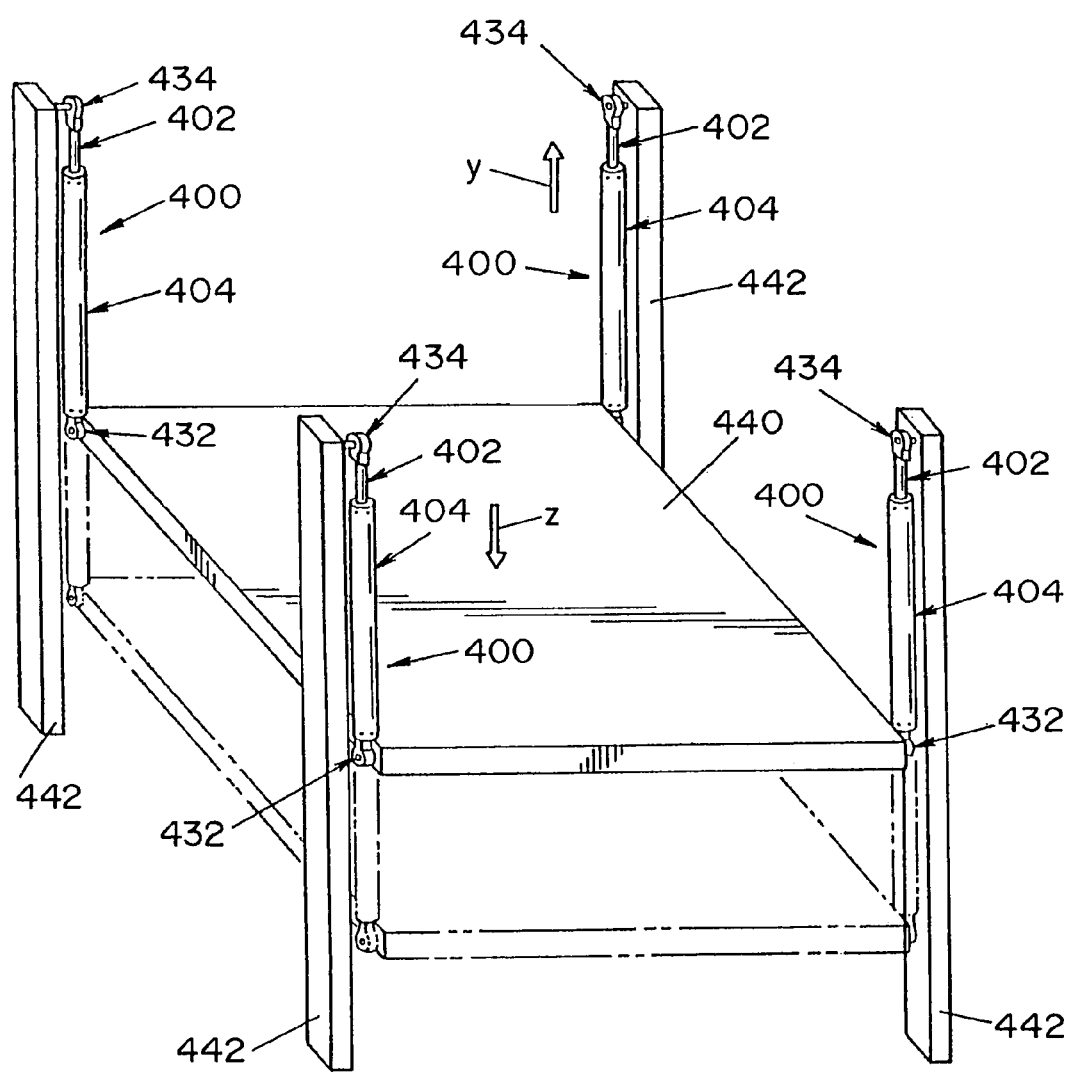
FIG. 21 is a perspective view illustrating a use of the compression spring rod of FIGS. 19 and 20.
Figure 24:
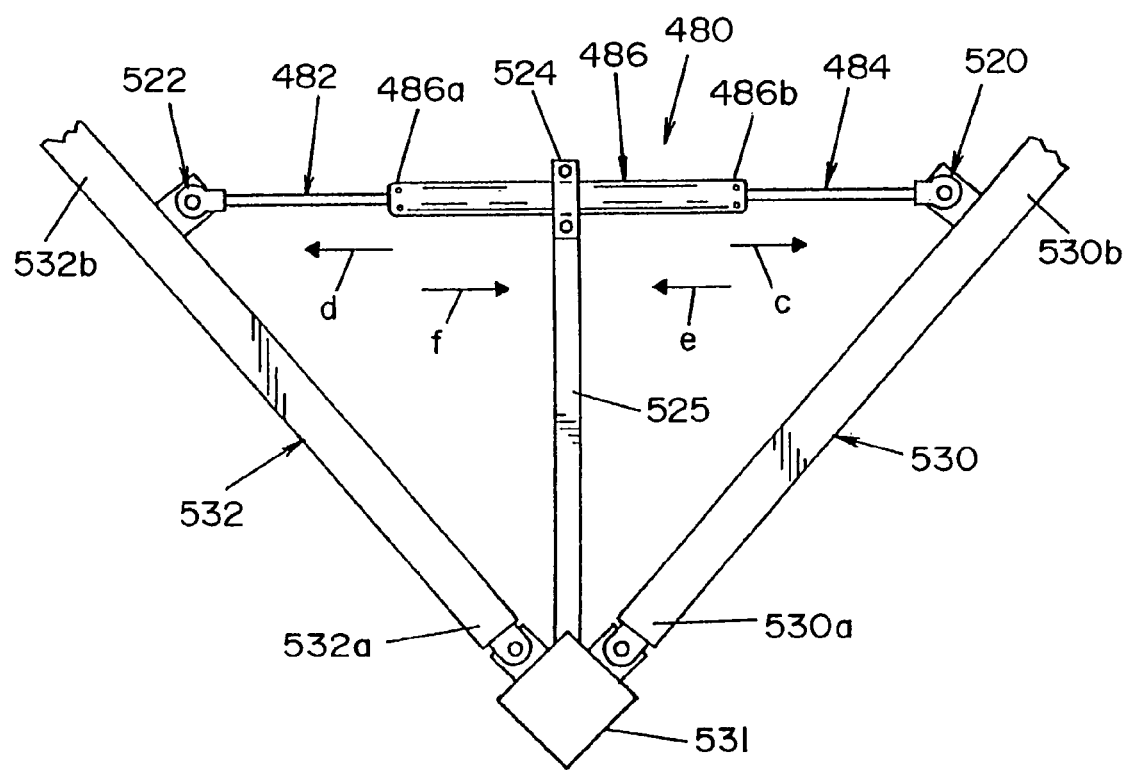

Several non-limiting applications of the spring system of the present invention are illustrated and described below and are illustrated in FIGS. 18, 21 and 24.

The compression spring systems described above with respect to FIGS. 1-11 can also be used in the compression spring system set forth in FIGS. 12-16, 19, 20, 22 and 23 which are described in detain in U.S. patent application Ser. No. 10/056,941 filed Jan. 28, 2002, which is incorporated herein. The embodiments of the invention illustrated in FIGS. 12-24 will be briefly described below.

Referring now to FIG. 12, a compression spring system 300 has an axis 311 and includes a rod member 322 which is axially extendable and retractable relative to a one-piece tubular housing 324. Rod 322 has an outer end 322a and an inner end 322b connected to a guide rod 326 as set forth more fully hereinafter. Guide rod 326 extends axially inwardly of inner end 322b of rod 322 and is surrounded by a first compression spring 328 which is supported by the exterior surface 346 of guide rod 326 against buckling. First compression spring 328 is surrounded by a second compression spring 330 which is supported against buckling by the interior surface 348 of housing 324. Alignment of compression springs 328 and 330 relative to one another and axis 311 is maintained by the exterior surface 346 of guide rod 326 in conjunction with the interior surface 348 of housing 324. Housing 324 has a mounting end 323 and an outer or opposite end 325, and compression springs 328 and 330 are axially captured between a tail bushing 338 at mounting end 323 and a guide member 334 mounted between guide rod 326 and the inner end 322b of rod 322 as set forth hereinafter. Tail bushing 338 is supported in housing 324 by bending the endmost portion of the housing radially inwardly to define a retaining flange 339.

Compression spring system 300 involves the use of a one-piece housing 324 which facilitates smooth movement of lift rod 322 and compression springs 328 and 330 during operation of the spring rod. As shown in the exploded view of FIG. 15, tail bushing 338 includes a neck portion 342 having a diameter sized to be received in the interior of compression spring 328. Tail bushing 338 also has a threaded stud 344 distal to the neck portion 342 which is received in a threaded recess 317 in a mounting element 318. Guide rod 326 includes a threaded stud 352 at the outer end thereof which passes through an opening 358 in guide member 334 and into a threaded bore 354 provided therefor in rod 322. Lift rod 322 passes through an opening 372 through a rod bushing 332 at outer end 325 of housing 324, and has a threaded stud 370 on outer end 322a thereof which is received in a threaded recess 327 provided therefor in a mounting element 320. Mounting elements 318 and 320 have openings 319 and 321 therethrough, respectively, for receiving a variety of different mounting components common in the industry including, for example, pins, bolts, swivels, and the like. Advantageously, the threaded studs 344 and 370 at opposite ends of the spring rod assembly provide for accommodating the use of different mounting elements than those shown so as to modify the assembly for use in a variety of structural environments.

Guide member 334 is slidable in housing 324 and includes a guide ring 335 of suitable material to facilitate such sliding movement. Rod 322 is slidably supported at end 325 of housing 324 by rod bushing 332 which is secured to the housing by a pair of set screws 340 having inner ends received in an annular recess 341 in the rod bushing. Rod bushing 332 is further axially retained in housing 324 by bending the outermost part of end 325 radially inwardly to provide a retaining flange 333. At full extension, rod 322 is cushioned by rod bushing 332 and an impact absorbing metal spring ring 336 received in a recess 355 at inner end 322b of rod 322 adjacent the axially outer face of guide member 334. When rod 322 is fully extended, spring ring 336 engages in a recess 351 in the axially inner end of rod bushing 332. Lubrication can be provided in housing 324 to facilitate the sliding movement of guide member 334 therein. As will be appreciated from the foregoing description, guide member 334 and rod bushing 332 support rod 322 for reciprocation in housing 324 such as to maintain minimal breakaway forces for rod 322. Additionally, guide member 334 and rod bushing 332 keep rod 322 coaxial with axis 311 and decrease the effect of side loading on the assembly.

Compression spring system 300, through the multiple spring rate characteristics of compression springs 328 and 330, serves to provide smooth extension forces to the movement of lift rod 322 from the retracted to the extended position thereof relative to housing 324. Depending upon the application, the appropriate load versus deflection can be determined and the corresponding physical and elastic properties of the combination of compression springs 328 and 330 can then be ascertained. The compression springs 328 and 330 can each be fabricated from spring material, such as music wire, and, for example, ASTM A228 or 302 stainless steel.

Each compression spring 328 and 330 has a different stress and strain characteristic. If the spring is considered to be a one-dimensional object, the only stress will be extensional (or compressional, which will be the negative of extensional) and the units of stress will be force per unit of extension. Within a range of compression, each spring obeys "Hook's Law" as described above.

Figure 16:
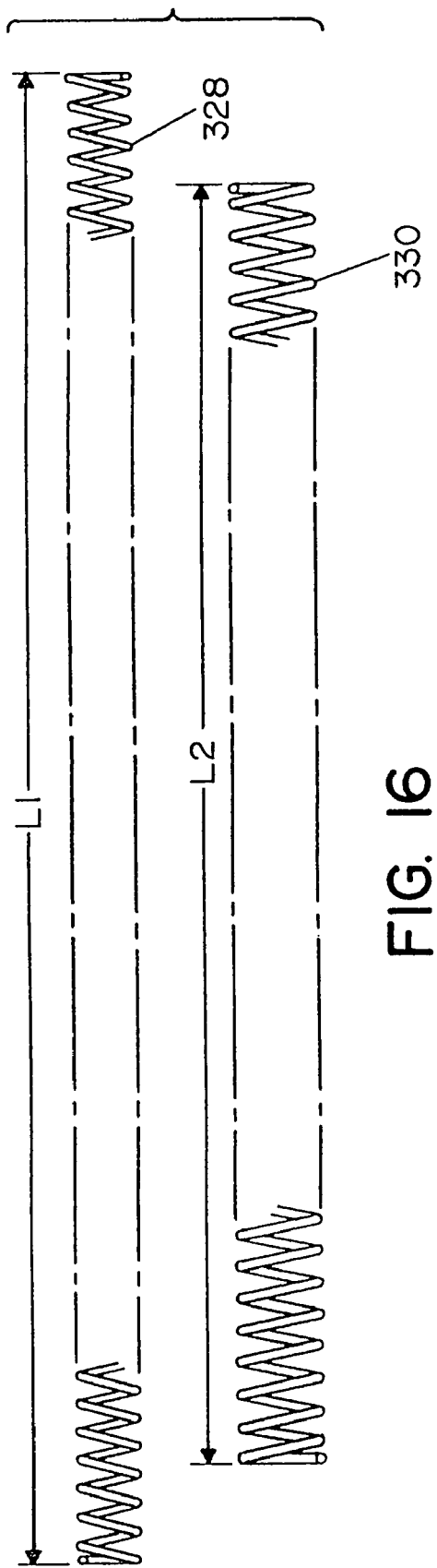
FIG. 16 is a side elevation view of the compression springs of the compression spring rod.
Figure 17:
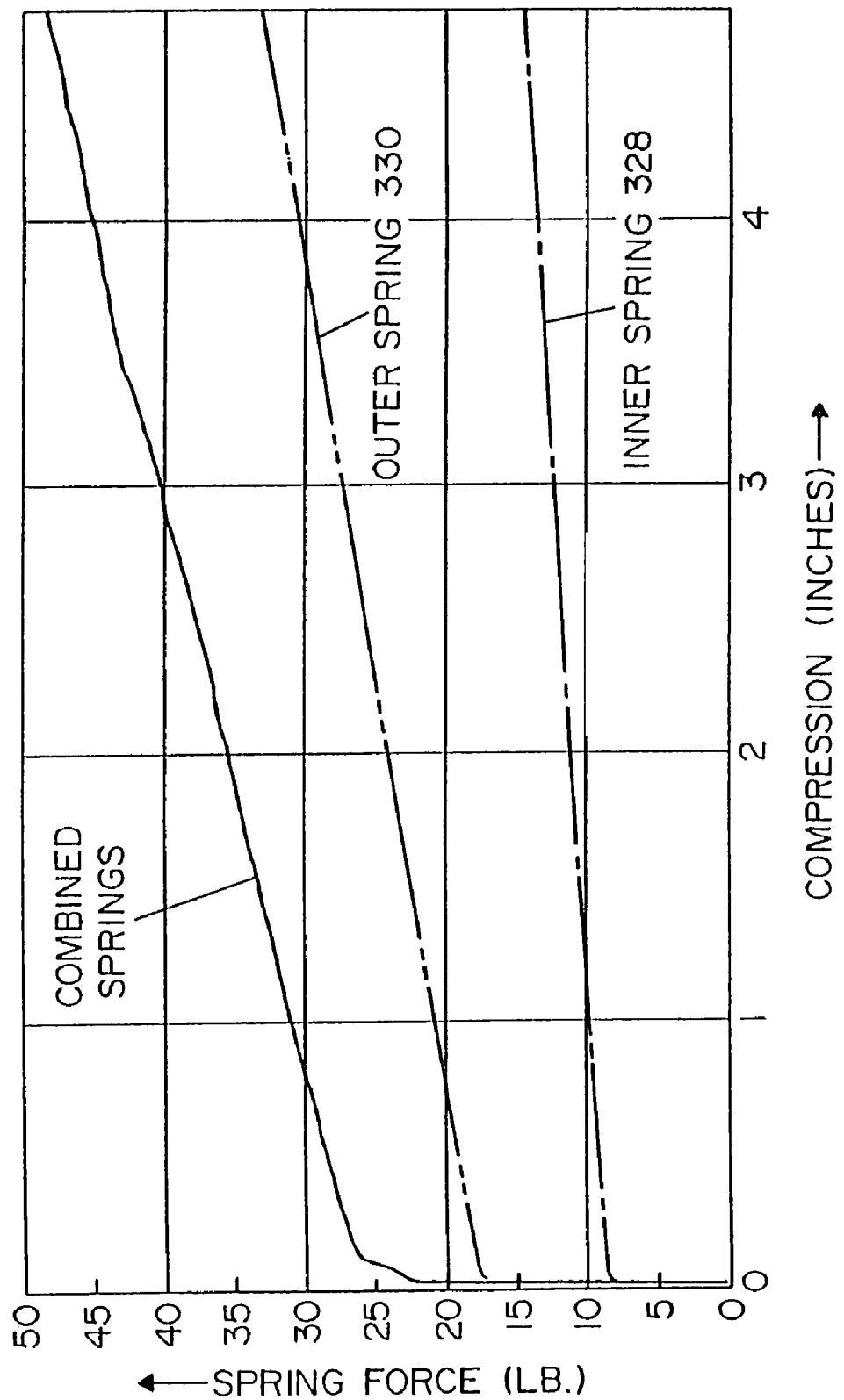
FIG. 17 is a graph illustrating the relationship between spring force and compression of the compression spring rod assembly.

As shown in FIG. 16, compression spring 328 has a free length L1 which is greater than the free length L2 of spring 330, and spring 328 has an outer diameter greater than that of compression spring 330. Also, the wire diameter of spring 328 is less than that of spring 330, and the spring rate of spring 328 is less than that of spring 330. As an example of one particular application, the specific physical characteristics of compression spring 328 are: wire diameter 0.055", inside diameter 0.5444", outside diameter 0.6544", free length 17.2", and a spring rate of 0.95 lbs./inch; and the physical characteristics of compression spring 330 are: wire diameter 0.081", inside diameter 0.675", outside diameter 0.837", free length 13.8", and a spring rate of 3.37 lbs./inch. FIG. 17 displays the load versus deflection curve for compression springs 328 and 330 having the foregoing specifications, and for the combined springs in the assembly shown in FIGS. 12 and 23. It is to be noted that springs 328 and 330 are oppositely wound and that this interrelationship together with the dimensional characteristics of the springs produces the combined linear load versus deflection graph depicted in FIG. 17. The different free lengths, as shown in FIG. 16, of springs 328 and 330 is one component that helps to control the forces and stabilize the guide member 334 and rod 322 during initial displacement thereof from the position shown in FIG. 12 to the position shown in FIG. 13 and during the termination of the movement from the position shown in FIG. 14 to the position shown in FIG. 12. In this respect, the longer spring 328 is, in the free state of the spring 330 shown in FIG. 12, slightly compressed to the length of the latter spring and, therefore, exerts a stabilizing force on the components which eliminates any free play during initial and terminal displacement thereof during use.

FIG. 18 illustrates two compression spring system 300 connected between a box 312 and a lid 314 therefor. While not shown in detail, lid 314 is suitably mounted on box 312, such as by hinges, to be pivotable about an axis A relative thereto. The mounting elements 318 and 320 of compression spring systems 300 are suitably secured to box 312 and lid 314, respectively. A latch 315 is shown on lid 314 for engagement with a keeper 316 on box 312 to releasably hold the lid closed relative to box 312. Latch 315 may be of various types common in the industry, and the method for releasing latch 315 may be by hand, foot, key, remote, etc. Subsequent to releasing the latch 315, compression spring systems 300 automatically extend from the position shown in FIG. 13 to the position as shown in FIG. 12, during which the compression spring systems 300 expand, releasing the stored compressive force in compression springs 328 and 330 to displace lid 314 from the closed to the open position thereof.

Figure 20:
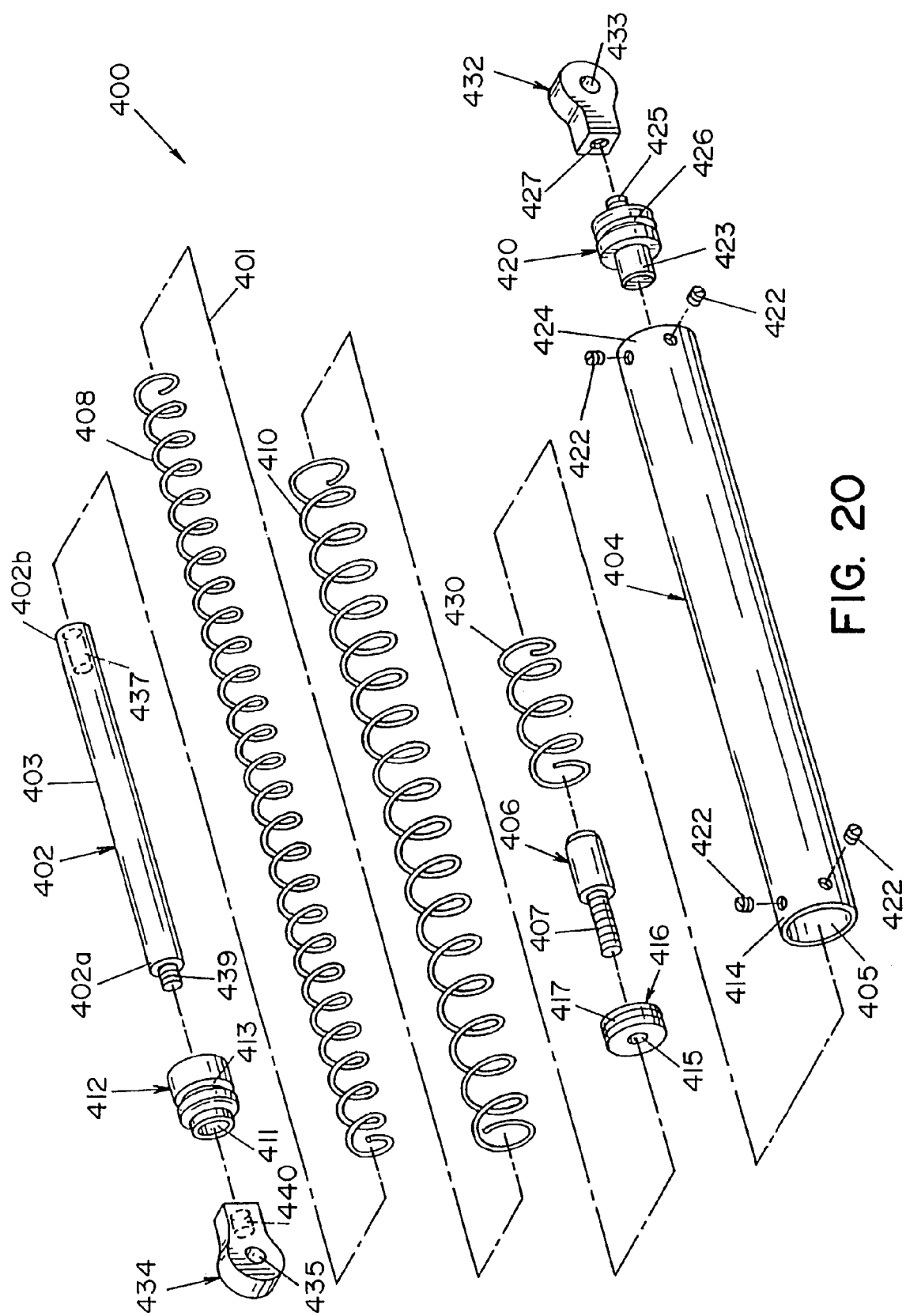
FIG. 20 is an exploded perspective view of the component parts of the compression spring rod shown in FIG. 19.

FIGS. 19 and 20 illustrate another embodiment of a compression spring assembly. Compression spring system 400 has an axis 401 and includes a rod 402 which is axially extendable and retractable relative to a one-piece tubular housing 404. Rod 402 has an outer end 402a and an inner end 402b connected to a guide rod 406 as set forth more fully hereinafter. Guide rod 406 extends axially inwardly of inner end 402b of rod 402. A first compression spring 408 is supported against buckling by the exterior surface 403 of rod 402. Spring 408 is surrounded by a second compression spring 410 which is supported against buckling by the interior surface 405 of housing 404. Coaxial alignment of compression springs 408 and 410 relative to one another and axis 401 is maintained by the exterior surface 403 of rod 402 in conjunction with the interior surface 405 of housing 404. When assembled, compression springs 408 and 410 are axially captured between a rod bushing 412 at end 414 of housing 404 and a guide member 416 secured to inner end 402b of the rod between the latter and guide rod 406. Guide rod 406 includes a threaded stud 407 at the outer end thereof which passes through an opening 415 in guide member 416 and into a threaded bore 437 provided therefor in rod 402. A tail bushing 420 is supported in end 424 of housing 404 by set screws 422 received in an annular recess 426 in the tail bushing 420. For the purpose set forth hereinafter, the component parts of compression spring system 400 are cushioned during operation of the compression spring assembly by a cushioning spring 430 which surrounds guide rod 406. Spring 430 is axially captured between the tail bushing 420 at end 424 and the guide member 416. Tail bushing 420 includes a neck portion 423 having a diameter sized to be received in the interior of cushioning spring 430. Tail bushing 420 also has a threaded stud 425 distal to neck portion 423 which is received in a threaded recess 427 in a mounting element 432. Guide member 416 is slidable in housing 404 and includes a guide ring 417 of suitable material to facilitate such sliding movement. Rod 402 is slidably supported at end 414 of housing 404 by rod bushing 412 which is secured to housing 404 by a pair of set screws 422 having inner ends received in an annular recess 413 in bushing 412. Rod 402 passes through an opening 411 in bushing 412 at outer end 414 of housing 404, and has a threaded stud 439 on outer end 402a thereof which is received in a threaded recess 440 provided therefor in a mounting element 434. As will be appreciated from the foregoing description, guide member 416 and rod bushing 412 support rod 402 for reciprocation in housing 404 such as to maintain minimal breakaway forces for rod 402. Mounting elements 432 and 434 have openings 433 and 435 therethrough, respectively, for receiving a variety of different mounting components common in the industry including, for example, pins, bolts, swivels, and the like. Mounting element 432 is fixedly attached to tail bushing 420 for mounting the compression spring assembly to a work supporting surface.

FIG. 21 illustrates four compression spring systems 400 each connected between a corresponding fixed support 442 and a platform or work supporting table 440. The compression spring systems 400, as shown in FIG. 21, are designed to expand in the direction of arrow z in response to a load applied to platform 440, thus compressing springs 408 and 410. Compression springs 408 and 410 then expand and retract the spring rods in the direction of arrow y as the load is progressively removed from platform 440. Compression springs 408 and 410 have the same physical characteristics as compression springs 328 and 330 described in FIG. 12. The arrangement of compression spring systems 400 and platform 440 as shown in FIG. 21 is suitable, for example, as a progressive load lifter, such as for metal plates. As plates are progressively stacked on platform 440, the compression spring systems 400 extend in the direction of arrow z, whereby the compression springs 408 and 410 are progressively compressed. As stated, when the springs are compressed ($\Delta L<0$) the resultant force attempts to expand the spring rod to its original length. Thus, as the plates are progressively removed from the platform, the compression springs 408 and 410 expand thereby causing the platform 440 to move in the direction of arrow y. In this manner, the springs provide controlled forces by which the top plate in the stack on the platform remains at a given level as the platform moves first in the z direction and then in the y direction. If the entire load is suddenly removed from the platform, the spring rods retract rapidly and cushioning spring 430 cushions the retracting movement to protect the spring rods against damage. Additionally, it will be appreciated that this embodiment is particularly well suited as a counterbalance system, conveyor chain tensioner, door lift assist, and dampener.

Figure 23:
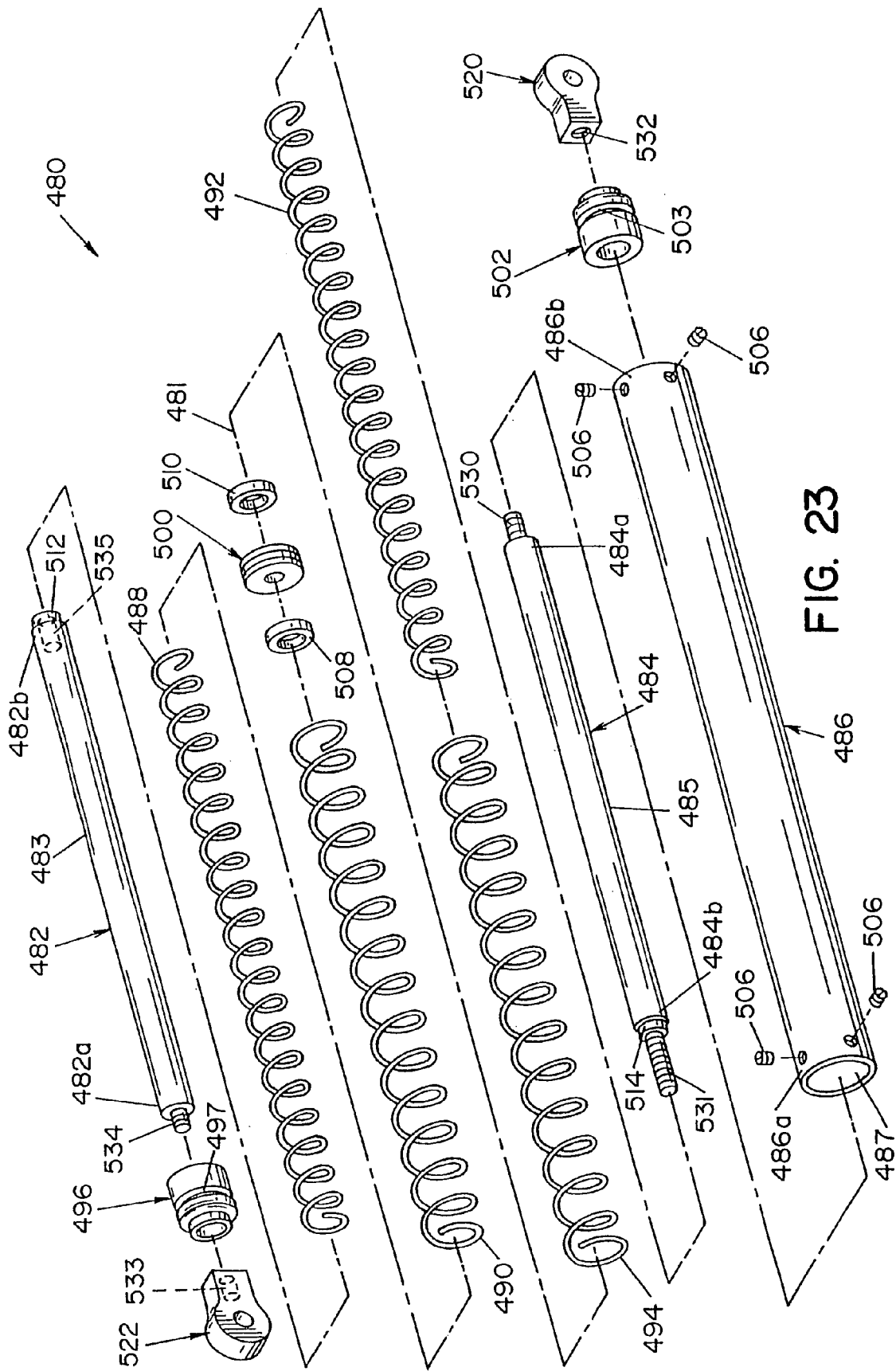
FIG. 23 is an exploded perspective view of the component parts of the compression spring rod shown in FIG. 22; and, FIG. 24 is an illustration of an application of the compression spring rod of FIGS. 22 and 23.

FIGS. 22 and 23 illustrate another embodiment of a compression spring system. In this embodiment, compression spring system 480 has an axis 481 and includes two rods 482 and 484 which are alternately axially extendable and retractable together relative to a one-piece tubular housing 486. Rod 482 has an outer end 482a and an inner end 482b and rod 484 has an outer end 484a and an inner end 484b connected to inner end 482b of rod 482 together with a guide member 500 as set forth more fully hereinafter. Rod 482 extends axially inwardly of end 486a of housing 486 and is surrounded by a first compression spring 488 which is supported by the exterior surface 483 of rod 482 against buckling. First compression spring 488 is surrounded by a second compression spring 490 which is supported against buckling by the interior surface 487 of housing 486. Rod 484 extends axially inwardly of opposite end 486b of housing 486 and is surrounded by a third compression spring 492 which is supported by the exterior surface 485 of rod 484 against buckling. Third compression spring 492 is surrounded by a fourth compression spring 494 which is supported against buckling by the interior surface 487 of housing 486. Alignment of compression springs 488, 490, 492, and 494 relative to one another and axis 481 is maintained by the exterior surfaces 483 and 485 of rods 482 and 484, respectively, in conjunction with the interior surface 487 of housing 486. Compression springs 488 and 490 are axially captured between a rod bushing 496 at end 486a and the guide member 500, and compression springs 492 and 494 are axially captured between a rod bushing 402 at end 486b of the housing and the guide member. Rod bushing 496 is supported in housing 486 by set screws 406 at end 486a thereof which extend into an annular recess 497 in bushing 496. Similarly, rod bushing 502 is supported in housing 486 by set screws 506 at end 486b thereof which extend into an annular recess 503 in the bushing. Axial retention of bushings 496 and 502 is further enhanced by bending the corresponding end of housing 486 radially inwardly of the bushings.

The compression spring system 480 involves the use of a one-piece housing 486 which facilitates smooth movement of rods 482 and 484 and compression springs 488, 490, 492, and 494 during operation of the spring rod. As shown in the exploded view of FIG. 23, rod 484 includes threads 530 and 531 at opposite ends of the rod. Threads 530 are received in a threaded recess 532 in a mounting element 520. Threads 531 pass through an opening in spring ring 510, an opening through guide member 500, and an opening in spring ring 508 and are received in a threaded recess 535 in rod 482. Rod 482 includes threads 534 distal to recess 535, which are received in a threaded recess 533 in a mounting element 522. As will be appreciated from the foregoing description, guide member 500 and rod bushings 496 and 502 support rods 482 and 484, respectively, for reciprocation in housing 486 such as to maintain minimal breakaway forces for rods 482 and 484 in use of the spring assembly.

Compression spring system 480 is adapted to apply an extension force, alternately, in axially opposite directions at a controllable rate. At full extension from housing 486, rods 482 and 484 are cushioned by rod bushings 496 and 502, respectively. In addition, impact in the direction of extension is absorbed by metal spring rings 508 and 510 which are received in recesses 512 and 514, respectively, at inner end 482b of rod 482 and inner end 484b of rod 484. Spring rings 508 and 510 are adjacent the axially outer faces of guide member 500 and respectively engage rod bushings 496 and 502 upon full extension of the rods in the respective direction of extension. Lubrication can be provided in housing 486 to facilitate the sliding movement of guide member 500 therein.

As shown in FIG. 24, compression spring system 480 is capable of self-centering a load which, as illustrated by way of example only, is in the form of two workpieces 530 and 532 having ends 530a and 532a pivotally attached to a fixed support member 531. Compression spring system 480 has the outer ends of rods 482 and 484 thereof respectively pivotally connected to ends 432b and 430a of the workpieces. Compression spring system 480 is supported centrally between workpieces 530 and 532 by a bracket 524 rigidly secured to support member 531 by a support arm 525. The springs of each pair of compression springs 488 and 490 and 492 and 494 have the same physical characteristics as compression springs 328 and 330 described with respect to FIG. 12. In the arrangement shown in FIG. 24, compression spring system 480 is a load centering assembly. In this respect, it will be appreciated that if either workpiece 530 or 532 is displaced in the direction of arrow c, rod 484 extends relative to housing 486 and the springs 492 and 494 are compressed. The resultant force of springs 492 and 494 in the direction of arrow e attempts to expand the springs to their original length. It will be appreciated that the opposite is true when either workpiece is displaced in the direction of arrow d. In this respect, springs 488 and 490 are compressed and springs 492 and 494 are totally relaxed. The resultant force in the direction of arrow e attempts to expand springs 488 and 490 to their original length. During return movement of workpieces 530 and 532 to the central position thereof, the relaxed pair of springs cushion the return movement. As with the earlier embodiments, the springs 488 and 490 and 492 and 494 provide controlled forces to self-center workpieces 530 and 532 when either is deflected from the neutral position. It will be appreciated that this embodiment is particularly well suited as a centering device in a steering mechanism, linkage mechanism, gating mechanism, and dampener.

While considerable emphasis has been placed herein on the structures and configurations of the preferred embodiments of the invention, it will be appreciated that other embodiments, as well as modifications of the embodiments disclosed herein, can be made without departing from the principles of the invention. In this respect, it will be appreciated that the spring rod can be used in applications other than those disclosed herein. Similarly, multiple combinations of coaxial and surrounding springs (i.e. three, four, etc.) may be configured to meet the desired load versus deflection for a particular application. Likewise, it will be appreciated that a spring rod according to the invention can be secured to relatively displaceable components in any number of different ways. These and other modifications of the preferred embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

Having thus described the invention, it is claimed:

1. A spring system comprising a housing having an axis, an internal chamber, and axially opposite bottom and top ends; a rod member coaxial with said axis and positioned within said internal chamber and having an inner end in said housing and an outer end axially outwardly of said top end of said housing; a guide member on said inner end of said rod member supporting said rod member for reciprocation axially of said housing between retracted and extended positions relative thereto; first and second compression springs each extending between said guide member and the bottom end of said housing; and top and bottom bushings, said top bushing positioned at least closely adjacent to said top end of said housing and said bottom bushing positioned at least closely adjacent to said bottom end of said housing; said top bushing including an opening to enable a portion of said rod member to pass therethrough and to support said rod member for reciprocation axially of said housing between retracted and extended positions relative thereto, said top bushing including a sealing arrangement positioned at least closely adjacent to a bottom of said top bushing to inhibit fluid from entering into and escaping from said internal chamber between said top bushing and said top end of said housing, said first and second springs being coaxial with one another and with said axis, at least one of said springs at least partially applying a force on said guide member as said rod member moves between fully retracted and fully extended positions, said guide member designed to move into engagement with or move to a position closely adjacent to said bushing when said rod member moves to a fully extended position, at least one of said springs having a free length that is at least a majority length of said internal chamber, both of said springs contacting said bottom bushing when said rod member in said fully retracted position, said guide member dividing said internal chamber into at least two sub-chambers, said guide member including a first passageway that at least partially regulates fluid flow between said at least two sub-chambers during said reciprocation of said rod member, said first passageway fully spaced from an outer edge of said guide member and passing fully through said guide member, said outer end of said rod member including a mounting element.

2. The spring system as defined in claim 1, wherein the direction of winding of said first compression spring is opposite to the direction of winding of said second compression spring.

3. The spring system as defined in claim 2, wherein the free length of said first compression spring is different from the free length of said second compression spring.

4. The spring system as defined in claim 3, wherein the outside diameter of said first compression spring is less than the outside diameter of said second compression spring.

5. The spring system as defined in claim 4, wherein the wire diameter of said first compression spring is less than the wire diameter of said second compression spring.

6. The spring system as defined in claim 2, wherein the outside diameter of said first compression spring is less than the outside diameter of said second compression spring.

7. The spring system as defined in claim 2, wherein the wire diameter of said first compression spring is less than the wire diameter of said second compression spring.

8. The spring system as defined in claim 2, wherein the outside diameter and wire diameter of said first compression spring are respectively less than the outside diameter and wire diameter of said second compression spring.

9. The spring system as defined in claim 8, wherein said first passageway in said guide member includes a one way valve arrangement.

10. The spring system as defined in claim 9, wherein said guide member includes a second passageway, said second passageway fully spaced from an outer edge of said guide member and spaced from said first passageway, said second passageway not in fluid communication with said first passageway.

11. The spring system as defined in claim 10, wherein said second passageway has a maximum fluid flow rate that is less than a maximum fluid flow rate of said first passageway.

12. The spring system as defined in claim 11, wherein said second passageway allows for fluid flow in both directions.

13. The spring system as defined in claim 10, wherein said second passageway allows for fluid flow in both directions.

14. The spring system as defined in claim 2, wherein said first passageway in said guide member includes a one way valve arrangement.

15. The spring system as defined in claim 14, wherein said guide member includes a second passageway, said second passageway fully spaced from an outer edge of said guide member and spaced from said first passageway, said second passageway not in fluid communication with said first passageway.

16. The spring system as defined in claim 15, wherein said second passageway has a maximum fluid flow rate that is less than a maximum fluid flow rate of said first passageway.

17. The spring system as defined in claim 16, wherein said bottom end is sealed to substantially prevent fluid flow through said bottom end.

18. The spring system as defined in claim 17, wherein said top end is sealed to substantially prevent fluid flow through said top end.

19. The spring system as defined in claim 18, wherein said second passageway allows for fluid flow in both directions.

20. The spring system as defined in claim 17, wherein said top end includes a passageway to allow for a controlled rate of fluid flow to exit said internal chamber as said rod member moves to said extended position.

21. The spring system as defined in claim 20, wherein said passageway in said top end is spaced from said rod member.

22. The spring system as defined in claim 20, wherein said passageway in said top end is adjacent to said rod member.

23. The spring system as defined in claim 16, wherein said top end is sealed to substantially prevent fluid flow through said top end.

24. The spring system as defined in claim 16, wherein said top end includes a passageway to allow for a controlled rate of fluid flow to exit said internal chamber as said rod member moves to said extended position.

25. The spring system as defined in claim 15, wherein said second passageway allows for fluid flow in both directions.

26. The spring system as defined in claim 2, wherein said guide member includes a second passageway, said second passageway fully spaced from an outer edge of said guide member and spaced from said first passageway, said second passageway not in fluid communication with said first passageway.

27. The spring system as defined in claim 26, wherein said second passageway has a maximum fluid flow rate that is less than a maximum fluid flow rate of said first passageway.

28. The spring system as defined in claim 1, wherein the free length of said first compression spring is different from the free length of said second compression spring.

29. The spring system as defined in claim 1, wherein the outside diameter of said first compression spring is less than the outside diameter of said second compression spring.

30. The spring system as defined in claim 1, wherein the wire diameter of said first compression spring is less than the wire diameter of said second compression spring.

31. The spring system as defined in claim 30, wherein the outside diameter and wire diameter of said first compression spring are respectively less than the outside diameter and wire diameter of said second compression spring.

32. The spring system as defined in claim 1, wherein the outside diameter and wire diameter of said first compression spring are respectively less than the outside diameter and wire diameter of said second compression spring.

33. The spring system as defined in claim 1, wherein said first passageway in said guide member includes a one way valve arrangement.

34. The spring system as defined in claim 33, wherein said guide member includes a second passageway, said second passageway fully spaced from an outer edge of said guide member and spaced from said first passageway, said second passageway not in fluid communication with said first passageway.

35. The spring system as defined in claim 34, wherein said second passageway has a maximum fluid flow rate that is less than a maximum fluid flow rate of said first passageway.

36. The spring system as defined in claim 35, wherein said second passageway allows for fluid flow in both directions.

37. The spring system as defined in claim 34, wherein said second passageway allows for fluid flow in both directions.

38. The spring system as defined in claim 1, wherein said guide member includes a second passageway, said second passageway fully spaced from an outer edge of said guide member and spaced from said first passageway, said second passageway not in fluid communication with said first passageway.

39. The spring system as defined in claim 38, wherein said second passageway has a maximum fluid flow rate that is less than a maximum fluid flow rate of said first passageway.

40. The spring system as defined in claim 1, wherein said bottom end is sealed to substantially prevent fluid flow through said bottom end.

41. The spring system as defined in claim 40, wherein said top end is sealed to substantially prevent fluid flow through said top end.

42. The spring system as defined in claim 40, wherein said top end includes a passageway to allow for a controlled rate of fluid flow to exit said internal chamber as said rod member moves to said extended position.

43. The spring system as defined in claim 1, wherein said top end is sealed to substantially prevent fluid flow through said top end.

44. The spring system as defined in claim 1, wherein said top end includes a passageway to allow for a controlled rate of fluid flow to exit said internal chamber as said rod member moves to said extended position.

45. The spring system as defined in claim 44, wherein said passageway in said top end is spaced from said rod member.

46. The spring system as defined in claim 44, wherein said passageway in said top end is adjacent to said rod member.

47. The spring system as defined in claim 1, including a guide rod that extends from said guide member toward said bottom end coaxial with said axis and said first compression spring surrounds said guide rod.

48. The spring system as defined in claim 1, including at least a third compression spring, said third compression spring extending between said guide member and said bottom end of said housing coaxial with said axis.

49. The spring system as defined in claim 1, including at least a third compression spring, said third compression spring extending between said guide member and said top end of said housing coaxial with said axis.

50. The spring system as defined in 49, wherein a direction of winding of said first and third compression springs is opposite to a direction of winding of said second compression spring.

51. The spring system as defined in claim 49, wherein a length of said first and third compression springs are the same.

52. The spring system as defined in claim 49, wherein outside diameters of said first and third compression springs are less than an outside diameter of said second compression spring.

53. The spring system as defined in claim 49, wherein an outside diameter and wire diameter of said first and third compression springs is less respectively than an outside diameter and wire diameter of said second compression spring.

54. A method of controlling the rate of extension and retraction of a spring rod of a spring system comprising:
   providing a housing having a longitudinal axis, an internal chamber, and axially opposite bottom and top ends, said spring rod coaxial with said axis and positioned within said internal chamber, said spring rod having an inner end in said housing and an outer end axially outwardly of said top end of said housing, said outer end of said spring rod including a mounting element;
   providing a guide member positioned on said inner end of said spring rod, said guide member supporting said spring rod for reciprocation axially in said housing between a fully retracted and a fully extended position relative thereto, said guide member dividing said internal chamber into at least upper and lower sub-chambers;

providing first and second compression springs each extending between said guide member and the bottom opposite end of said housing, said first and second springs being coaxial with one another and with said axis, at least one of said springs at least partially applying a force on said guide member as said rod member moves between fully retracted and fully extended positions, at least one of said springs having a free length that is at least a majority length of said internal chamber, both of said springs designed to contact said bottom bushing when said rod member in said fully retracted position;

providing top and bottom bushings, said top bushing positioned at least closely adjacent to said top end of said housing and said bottom bushing positioned at least closely adjacent to said bottom end of said housing; said top bushing including an opening to enable a portion of said rod member to pass therethrough and to support said rod member for reciprocation axially of said housing between retracted and extended positions relative thereto, said top bushing including a sealing arrangement positioned at least closely adjacent to a bottom of said top bushing to inhibit fluid from entering into and escaping from said internal chamber between said top bushing and said top end of said housing, said guide member designed to move into engagement with or move to a position closely adjacent to said top bushing when said rod member moves to a fully extended position;

at least partially controlling the rate of retraction of said spring rod by selecting the spring rate of at least one of said compression springs; and, at least partially controlling the rate of extension of said spring rod by at least partially regulating a fluid flow rate between said sub-chambers, said step of at least partially controlling the rate of extension includes providing a first fluid passageway that passes fully through said guide member, said first passageway fully spaced from an outer edge of said guide member.

55. The method as defined in claim 54, wherein said first passageway at least partially regulates fluid flow between said upper and lower sub-chambers during said extension of said spring rod.

56. The method as defined in claim 55, wherein said first passageway includes a one way valve arrangement.

57. The method as defined in claim 56, wherein said one way valve substantially prevents fluid flow from said upper sub-chamber to said lower sub-chamber during said extension of said spring rod.

58. The method as defined in claim 57, wherein said guide member includes a second passageway, said second passageway fully spaced from an outer edge of said guide member and spaced from said first passageway, said second passageway not in fluid communication with said first passageway.

59. The method as defined in claim 58, wherein said second passageway has a maximum fluid flow rate that is less than a maximum fluid flow rate of said first passageway.

60. The method as defined in claim 59, wherein said bottom end of said housing substantially prevents fluid flow through said bottom end to an exterior of said housing.

61. The method as defined in claim 60, wherein said top end of said housing substantially prevents fluid flow through said top end to an exterior of said housing.

62. The method as defined in claim 61, wherein at least one of said first and second compression springs in a partially compressed state when said spring rod member is in said fully extended position.

63. The method as defined in claim 60, wherein said top end includes a top passageway to allow a controlled rate of fluid flow to exit said upper sub-chamber as said spring member moves to said fully extended position.

64. The method as defined in claim 63, wherein said top passageway is spaced from said spring rod.

65. The method as defined in claim 63, wherein said top passageway is adjacent to said spring rod.

66. The method as defined in claim 58, wherein said second passageway allows for fluid flow in both directions.

67. The method as defined in claim 55, wherein said guide member includes a second passageway, said second passageway fully spaced from an outer edge of said guide member and spaced from said first passageway, said second passageway not in fluid communication with said first passageway.

68. The method as defined in claim 67, wherein said second passageway has a maximum fluid flow rate that is less than a maximum fluid flow rate of said first passageway.

69. The method as defined in claim 68, wherein said second passageway allows for fluid flow in both directions.

70. The method as defined in claim 67, wherein said bottom end of said housing substantially prevents fluid flow through said bottom end to an exterior of said housing.

71. The method as defined in claim 70, wherein said top end of said housing substantially prevents fluid flow through said top end to an exterior of said housing.

72. The method as defined in claim 71, wherein at least one of said first and second compression springs in a partially compressed state when said spring rod member is in said fully extended position.

73. The method as defined in claim 70, wherein said top end includes a top passageway to allow a controlled rate of fluid flow to exit said upper sub-chamber as said spring member moves to said fully extended position.

74. The method as defined in claim 73, wherein said top passageway is spaced from said spring rod.

75. The method as defined in claim 73, wherein said top passageway is adjacent to said spring rod.

76. The method as defined in claim 70, wherein said second passageway allows for fluid flow in both directions.

77. The method as defined in claim 67, wherein said second passageway allows for fluid flow in both directions.

78. The method as defined in claim 54, wherein said bottom end of said housing substantially prevents fluid flow through said bottom end to an exterior of said housing.

79. The method as defined in claim 54, wherein said top end of said housing substantially prevents fluid flow through said top end to an exterior of said housing.

80. The method as defined in claim 54, wherein said top end includes a top passageway to allow a controlled rate of fluid flow to exit said upper sub-chamber as said spring member moves to said fully extended position.

81. The method as defined in claim 80, wherein said top passageway is spaced from said spring rod.

82. The method as defined in claim 80, wherein said top passageway is adjacent to said spring rod.

83. The method defined in claim 54, wherein a direction of winding of said first compression spring is opposite to a direction of winding of said second compression spring.

84. The method as defined in claim 54, wherein a free length of said first compression spring is different from a free length of said second compression spring.

85. The method as defined in claim 54, wherein an outside diameter of said first compression spring is less than an outside diameter of said second compression spring.

86. The method as defined in claim 54, wherein a wire diameter of said first compression spring is less than a wire diameter of said second compression spring.

87. The method as defined in claim 54, including a bushing at said top end of said housing to support said rod for reciprocation axially of said housing between fully retracted and fully extended positions relative thereto.

88. The method as defined in claim 54, including a guide rod that extends from said guide member toward said bottom end coaxial with said axis and said first compression spring surrounds said guide rod.

89. The method as defined in claim 54, including at least a third compression spring, said third compression spring extending between said guide member and said bottom end of said housing coaxial with said axis.

90. The method as defined in claim 54, including at least a third compression spring, said third compression spring extending between said guide member and said top end of said housing coaxial with said axis.

91. The method as defined in claim 90, wherein a direction of winding of said first and third compression springs is opposite to a direction of winding of said second compression spring.

92. The method as defined in claim 90, wherein a length of said first and third compression springs are the same.

93. The method as defined in claim 90, wherein an outside diameter of said first and third compression springs are less than an outside diameter of said second compression spring.

94. The method as defined in claim 90, wherein an outside diameter and wire diameter of said first and third compression springs is less respectively than an outside diameter and wire diameters of said second compression spring.

95. The method as defined in claim 54, wherein at least one of said first and second compression springs in a partially compressed state when said spring rod member is in said fully extended position.

* * * * *